(12) United States Patent
Zinevich

(10) Patent No.: US 9,635,397 B2
(45) Date of Patent: Apr. 25, 2017

(54) DETECTING CPD IN HFC NETWORK WITH OFDM SIGNALS

(71) Applicant: ARCOM DIGITAL, LLC, Syracuse, NY (US)

(72) Inventor: Victor M. Zinevich, Voronezh (RU)

(73) Assignee: ARCOM DIGITAL, LLC, Syracuse, NY (US)

( * ) Notice: Subject to any disclaimer, the term of this patent is extended or adjusted under 35 U.S.C. 154(b) by 0 days.

(21) Appl. No.: 14/918,643

(22) Filed: Oct. 21, 2015

(65) Prior Publication Data

US 2016/0119662 A1     Apr. 28, 2016

Related U.S. Application Data

(60) Provisional application No. 62/067,002, filed on Oct. 22, 2014.

(51) Int. Cl.
*H04N 21/242* (2011.01)
*H04B 17/00* (2015.01)
(Continued)

(52) U.S. Cl.
CPC ......... *H04N 21/2404* (2013.01); *H04L 1/206* (2013.01); *H04N 21/2385* (2013.01);
(Continued)

(58) Field of Classification Search
CPC .............. H04N 21/2404; H04N 17/00; H04B 17/0085; H04B 17/345; H04B 3/46; H03F 1/3247; H04L 1/206; H04L 27/2601
See application file for complete search history.

(56) References Cited

U.S. PATENT DOCUMENTS 5,461,318 A    10/1995 Borchert et al.
5,608,428 A *  3/1997 Bush ............... H04H 20/12
                                              348/180
(Continued)

FOREIGN PATENT DOCUMENTS

EP         0487306 A2    5/1992
WO    WO0057571 A1       9/2000
(Continued)

OTHER PUBLICATIONS

European Patent Office, International Search Report in PCT/US2015/056800, filed Oct. 22, 2015, (Publication No. WO2016065094), PCT counterpart to instant U.S. application, Search Report dated Jan. 28, 2016, pp. 1-5, published by World Intellectual Property Organization (WIPO), Geneva, Switzerland.

(Continued)

*Primary Examiner* — Benjamin R Bruckart
*Assistant Examiner* — Jen-Shi Huang
(74) *Attorney, Agent, or Firm* — Lawrence P. Trapani, Esq.

(57) ABSTRACT

A apparatus or method for detecting CPD in an HFC network, comprising: (a) acquiring digital RF downstream signals from a CMTS or CM; (b) emulating even and odd order IM distortion products from the downstream signals; (c) acquiring RF upstream signals from the CMTS during a quiet period; (d) cross-correlating the RF upstream signals with the emulated even and odd order IM products to produce even and odd order cross-correlation functions, respectively; (e) accumulating, separately, a multiplicity of even and odd order cross-correlation functions; (f) calculating even and odd order cross-correlation envelopes from the accumulated even and odd order cross-correlation functions, respectively; and (g) detecting a CPD source from either or
(Continued)

both of the even and odd order cross-correlation envelopes by the presence of a peak in either or both of the envelopes.

27 Claims, 9 Drawing Sheets

(51) Int. Cl.
    *H04L 27/26*         (2006.01)
    *H04N 21/24*         (2011.01)
    *H04L 1/20*          (2006.01)
    *H04N 21/2385*     (2011.01)

(52) U.S. Cl.
    CPC ....... *H04N 21/242* (2013.01); *H04B 17/0085* (2013.01); *H04L 27/2601* (2013.01)

(56) References Cited

U.S. PATENT DOCUMENTS

| | | | |
|---|---|---|---|
| 6,070,091 | A | 5/2000 | Hogevik |
| 6,144,692 | A | 11/2000 | Beck |
| 6,417,942 | B1 | 7/2002 | Seto et al. |
| 6,425,132 | B1 | 7/2002 | Chappell |
| 6,570,394 | B1* | 5/2003 | Williams ............... H04N 17/00 324/620 |
| 6,687,632 | B1* | 2/2004 | Rittman ................. H04B 3/46 250/336.1 |
| 6,934,655 | B2 | 8/2005 | Jones et al. |
| 7,024,680 | B2 | 4/2006 | Howard |
| 7,069,163 | B2 | 6/2006 | Gunther et al. |
| 7,334,253 | B2* | 2/2008 | Howard ............... H04L 1/0006 455/423 |
| RE40,322 | E* | 5/2008 | Williams ..................... 324/620 |
| 7,415,367 | B2 | 8/2008 | Williams |
| 7,584,496 | B2 | 9/2009 | Zinevich |
| 7,788,050 | B2 | 8/2010 | Williams |
| 8,032,102 | B2 | 10/2011 | Molnar et al. |
| 8,054,088 | B2 | 11/2011 | Delforce et al. |
| 8,058,880 | B2 | 11/2011 | Bradley et al. |
| 8,294,469 | B2 | 10/2012 | Bradley |
| 8,369,812 | B2 | 2/2013 | Lehman |
| 8,548,760 | B2* | 10/2013 | Chappell ............... H04N 7/173 324/512 |
| 8,867,561 | B2 | 10/2014 | Urban et al. |
| 9,100,339 | B1 | 8/2015 | Hamzeh |
| 9,112,762 | B2 | 8/2015 | Murphy |
| 9,203,664 | B2 | 12/2015 | Currivan et al. |
| 9,209,863 | B2 | 12/2015 | Williams et al. |
| 9,225,387 | B2 | 12/2015 | Williams et al. |
| 9,264,924 | B2 | 2/2016 | Williams |
| 2002/0086641 | A1 | 7/2002 | Howard |
| 2002/0094785 | A1 | 7/2002 | Deats |
| 2003/0040277 | A1 | 2/2003 | Deats |
| 2004/0032296 | A1* | 2/2004 | Akaiwa ................. H03F 1/3247 330/149 |
| 2004/0039976 | A1 | 2/2004 | Gunther et al. |
| 2004/0245995 | A1 | 12/2004 | Williams |
| 2005/0233702 | A1* | 10/2005 | Ferguson ............. H04B 17/345 455/67.14 |
| 2006/0012376 | A1 | 1/2006 | Furse et al. |
| 2006/0271986 | A1* | 11/2006 | Vogel ..................... H04N 7/173 725/111 |
| 2008/0039045 | A1 | 2/2008 | Filipovic et al. |
| 2008/0320541 | A1 | 12/2008 | Zinevich |
| 2009/0125253 | A1 | 5/2009 | Blair et al. |
| 2010/0070228 | A1 | 3/2010 | Chappell |
| 2011/0194418 | A1 | 8/2011 | Wolcott et al. |
| 2011/0194597 | A1 | 8/2011 | Wolcott et al. |
| 2011/0224923 | A1 | 9/2011 | Blair et al. |
| 2012/0155307 | A1 | 6/2012 | Turk et al. |
| 2013/0176860 | A1 | 7/2013 | Wolcott et al. |
| 2013/0215953 | A1* | 8/2013 | Currivan ............... H04L 27/01 375/232 |
| 2013/0322569 | A1 | 12/2013 | Murphy |
| 2014/0036975 | A1 | 2/2014 | Wolcott et al. |
| 2014/0140522 | A1* | 5/2014 | Deng .................. H04R 3/08 381/59 |
| 2014/0241409 | A1 | 8/2014 | Wolcott et al. |
| 2014/0254392 | A1 | 9/2014 | Wolcott et al. |
| 2014/0254407 | A1 | 9/2014 | Williams |
| 2014/0294052 | A1 | 10/2014 | Currivan et al. |
| 2015/0043624 | A1 | 2/2015 | Williams et al. |
| 2015/0078194 | A1 | 3/2015 | Currivan et al. |
| 2015/0229416 | A1 | 8/2015 | Williams |
| 2015/0326464 | A1 | 11/2015 | Wolcott et al. |
| 2016/0028496 | A1 | 1/2016 | Currivan et al. |
| 2016/0057479 | A1 | 2/2016 | Bush et al. |
| 2016/0112734 | A1 | 4/2016 | Williams et al. |

FOREIGN PATENT DOCUMENTS

| | | |
|---|---|---|
| WO | WO2004070398 A2 | 8/2004 |
| WO | WO2006091708 A2 | 8/2006 |
| WO | WO2012009757 A1 | 1/2012 |
| WO | WO2012126056 A1 | 9/2012 |

OTHER PUBLICATIONS

European Patent Office, Written Opinion of International Searching Authority in PCT/US2015/056800, filed Oct. 22, 2015, (Publication No. WO2016065094), PCT counterpart to instant U.S. application, Written Opinion dated Jan. 28, 2016, pp. 1-6, published by World Intellectual Property Organization (WIPO), Geneva, Switzerland.

U.S. Appl. No. 62/054,529, filed Sep. 24, 2014, Williams et al., benefit of which is claimed in 20160112734 (cited above), PDF document pp. 31-32.

Campos, Alberto, Andreoli-Fang, Jennifer & Ganti, Vivek, Cable Network Management Infrastructure Evolution, Apr. 2014, pp. 1-19, Cable Television Laboratories, Inc. (Cablelabs®), Louisville, CO.

Cable Television Laboratories, Inc. (CableLabs®), Data-Over-Cable Service Interface Specifications DOCSIS® 3.1, Physical Layer Specification, CM-SP-PHYv3.1-I03-140610, Jun. 10, 2014, pp. 85, 116-119, 143-145, 209-210; pp. 134, 158-162, 166-169, & 182-186, Rev.103, CableLabs®, Louisville, CO, www.cablelabs.com/wp-content/uploads/specdocs/CM-SP-PHYv3.1-I03-140610.pdf.

Campos, Alberto, Hamzeh, Belal & Williams, Thomas, Testing for Nonlinear Distortion in Cable Networks, Oct. 2013, pp. 4-16, Cable Television Laboratories, Inc. (Cablelabs®), Louisville, CO.

Williams, Thomas, Hamzeh, Belal & Hranac, Ron, Field Measurements of Nonlinear Distortion in Digital Cable Plants, Jan. 2013, pp. 1-10, Cable Television Laboratories, Inc. (Cablelabs®), Louisville, CO.

Cable Television Laboratories, Inc. (Cablelabs®), DOCSIS® Best Practices and Guidelines, Proactive Network Maintenance Using Pre-equalization, CM-GL-PNMP-V02-110623, Jun. 23, 2011, pp. 11-12, 25, 44-45, 68, 78, 111-112, & 116-122 (pp. 1-133), Cable Television Laboratories, Inc., Louisville, CO, www.cablelabs.com/wp-content/uploads/2014/05/CM-GL-PNMP-V02-110623.pdf.

Moran, Jack, RF Impairments in the Return Path & Their Impact on DOCSIS Performance or The RF World According to Jack, Powerpoint Presentation, dated Sep. 23, 2003, revised Jan. 13, 2004; pp. 2, 4-5, 10-13, 37-54; Motorola and SCTE Proceedings.

Patel, Bharat (Barry), Report on Common Path Distortions or Characterization of Common Path Distortions, dated Feb. 3, 1998, pp. 1-2, 5-9, 16-18, 22-23, 27-28; SCTE (http://cable.doit.wisc.edu/cpd/cpd2.pdf or http://www.arcomlabs.com/images/documents/cpd_report.pdf).

International Telecommunications Union, Control of Passive Intermodulation Products, RadioCommunication Bureau Report 1049-1, 1990, pp. 229-234, International Telecommunications Union, www.itu.int/dms_pub/itu-r/opb/rep/R-REP-M.1049-1-1990-PDF-E.pdf.

* cited by examiner

| Embodiments | Downstream Signal (used to emulate CPD echo signal and create reference samples for CPD detection) | Upstream Signal (cross-correlate with reference samples to detect CPD echo signal) | Characteristics | |
|---|---|---|---|---|
| 1. Capture OFDM symbols at CMTS | OFDM symbols before IDFT | Quiet probe OFDM symbol samples | Accurate formation of reference samples for cross-correlation detection of CPD echo signal | Energy and bandwidth of probe and echo signals are limited by upstream and down-stream OFDM channels. |
| 2. Capture OFDM symbols and full-band time-domain samples at CMTS | OFDM symbols before IDFT | Full-band time-domain samples at CMTS during quite period | Accurate formation of reference samples for cross-correlation detection of CPD echo signal<br><br>Use of full upstream spectrum signal energy for detection of CPD echo signal | Energy and bandwidth of probe signal are limited by downstream OFDM channel. |
| 3. Capture full-band time-domain samples at CM and CMTS | Full-band time-domain samples at CM or CMTS | Full-band time-domain samples at CMTS during quite period | Use of full downstream spectrum signal energy for probe signal and full upstream spectrum signal energy for detection of CPD echo signal | More time needed for retrieving time-domain samples from CM, and extra signal traffic between CM and CMTS. |

FIG. 4

DETECTING CPD IN HFC NETWORK WITH OFDM SIGNALS

CROSS-REFERENCE TO RELATED APPLICATIONS

This application claims the benefit of U.S. Provisional Application No. 62/067,002, filed Oct. 22, 2014.

BACKGROUND OF THE INVENTION

Field of Invention

The present invention relates generally to monitoring impairments in a CATV or HFC network, and more particularly methods and apparatus for pinpointing nonlinear impairments such as common path distortion (CPD) and passive intermodulation distortion (PIM) in a modern CATV or HFC network transmitting OFDM signals.

Background Art

One type of impairment in a modern hybrid fiber coax (HFC) network is common path distortion (CPD). This impairment is nonlinear and involves the intermodulation of forward path (or down stream) signals occurring at various network components in the "common path" (i.e., both forward and return paths) of the network, such as amplifiers, connectors, taps, terminations, etc. The intermodulation of the forward path signals is the result of a so-called "diode effect" caused by corrosion of the above-mentioned components in the network. A very good explanation of the causes of CPD is found in an article by Bharat (Barry) Patel, entitled, "Report on Common Path Distortions" or "Characterization of Common Path Distortions," dated Feb. 3, 1998 (http://cable.doit.wisc.edu/cpd/cpd2.pdf or http://www.arcomlabs.com/images/documents/cpd_report.pdf). CPD produces composite triple beat (CTB) and composite second order (CSO) distortion products in both the upstream and downstream spectrums (return and forward paths) of the HFC network. In addition,the locations of CPD sources are often locations where noise is introduced into the CATV network (i.e., ingress points). As explained in a presentation entitled, "RF Impairments in the Return Path & Their Impact on a DOCSIS Performance or the RF World according to Jack," by Jack Moran, Motorola, dated Sep. 23, 2003, CPD influence is one of the most important impairment problems affecting the quality of return path service. Accordingly, the task of finding and eliminating CPD is an important one to ensure quality of service in both the upstream and downstream spectrums. However, this task is a challenge due to the hundreds and sometimes thousands of nodes, network components, and miles of network cable in a network.

More specifically, with respect to modern HFC networks, the detection and location of CPD is important, because CPD impacts data transmission particularly in the upstream frequency spectrum. For many years now, network impairment statistics have been collected by different monitoring systems of cable operators, and such statistics have convincingly established that CPD exists in substantially all HFC networks and that the CPD problem increases as such networks age and corrosion of network components becomes more prevalent.

In recently specified and implemented HFC networks ("modern HFC networks"), the CPD impairment problem is expected to become more difficult to solve due to several factors. First, the number of quadrature amplitude modulated (QAM) signals in the upstream spectrum (or return path) will increase due to channel bonding technology specified in the Data-Over-Cable Service Interface Specifications (DOCSIS) 3.0 specification, published in August 2006 by Cable Television Laboratories, Inc. (CableLabs®) of Louisville, Colo. As a result, the level of each QAM signal will be reduced and the immunity of these signals to noise (in the return path) will be reduced as well. Second, there is a migration away from analog channels to all digital channels in the downstream spectrum (or forward path). In the case of analog channels, CPD generally appears at harmonics of 6 MHz and is thus relatively easy to detect, while, in the case of QAM or other digital channels, CPD appears as flat noise spread over the full upstream spectrum, making it more difficult to detect. Third, under the very recent DOCSIS 3.1 specification (October 2013), the bandwidth of both the downstream and upstream spectrums in HFC networks will increase. For example, the upstream spectrum bandwidth may increase to 204 MHz and the downstream spectrum bandwidth may increase to 1794 MHz. With these increases in bandwidth, the number of different order nonlinear intermodulation (IM) products generated at a CPD source will increase, which may impact data signals at least in the upstream spectrum.

There are basically two known methods of detecting CPD. The first is to use a spectrum analyzer to monitor the upstream and/or downstream spectrums for IM products, presumably caused by CPD. Such a method is adequate for legacy HFC networks carrying a large number of analog channels. In these networks, CPD looks like a number of discrete 6 MHz harmonics (for NTSC frequency plan). But, in the case of an all-digital network (e.g., QAM and/or OFDM signals), CPD in the upstream spectrum looks like flat noise and is not easily distinguishable from additive ingress noise. Another limitation is that a spectrum analyzer does not allow one to identify multiple sources of CPD, which is a typical impairment scenario. Also, a CPD source cannot be directly located using a spectrum analyzer. Further, a spectrum analyzer is unable to detect very low level CPD distortion products. The ability to detect very low level CPD is desirable because it allows one to identify CPD sources early in their development, before they impact signal quality, thus making it possible to implement a preventative or proactive network maintenance program. Also, very low level CPD detection is useful to identify CPD sources that may currently impact signal quality, but are intermittent (which has been shown to be a common behavior). In such case, low level CPD may increase dramatically for a moment due to mechanical (e.g., wind), temperature, moisture and other environmental factors.

The second known method of detecting CPD is known as the Hunter® Xcor® system available from Arcom Digital, LLC, Syracuse, N.Y. (http://www.arcomlabs.com/4Hunter-Platform.html). This system is described in the following patent documents: U.S. Pat. No. 7,415,367 to Williams and U.S. Pat. No. 7,584,496 to Zinevich. The Hunter® Xcor® system is sometimes referred to as a CPD radar or a nonlinear radar system. The main idea behind the system is to use regular, commercial traffic, downstream signals as a probe signal and examine the so-called "echo" of the probe signal (or "echo signal"), which, due to the non-linearity of the CPD impairment, is returned in the upstream spectrum. The echo signal comprises the IM products of the downstream signals (e.g., QAM signals) and is obviously delayed relative to the original downstream signals. The echo signal is artificially duplicated (or emulated), with a zero relative delay, at or near the origin of the downstream QAM signals. The zero-delay echo signal is created by mixing the downstream signals at a diode or other non-linear (active or passive) device. The resulting zero-delay echo signal is then sampled to produce reference samples. The reference samples are cross-correlated with samples of signals in the upstream spectrum, which include the actual echo signal (e.g., second and third order IM products). The cross-correlation output indicates a detection of the CPD source by a correlation peak and the position of the peak reveals a time delay associated with the round-trip propagation time of the downstream signals (probe signal) and the upstream CPD IM products (echo signal). From this time delay, and the use of a network map or time delay database, the location of the CPD can be found. The main advantages of this system are its ability to detect low level CPD and multiple CPD sources, due to good sensitivity and time delay resolution. This technology is now widely used in HFC networks across the United States and in many other countries. It has proven to be very effective in the early detection and location of CPD.

In a modern HFC network with a Converged Cable Access Platform (CCAP), as currently being specified in the DOCSIS 3.1 specification, there will be an increase in narrowcast signals in the downstream spectrum. For example, according to DOCSIS 3.1, the next generation cable modem termination systems (CMTS's) will form very wideband (e.g., up to 192 MHz) orthogonal frequency division multiplexing (OFDM) narrowcast signals. Narrowcast signals are (by name) tailored for narrower audiences and different packages of narrowcast signals are served to different audiences, in different nodes, from different CMTS's. Thus, a common and full downstream spectrum of signals for use as a probe signal (as found in current or legacy networks) will not generally be available or possible in the recently specified networks. Also, emulation of the echo signal (CPD IM products) has traditionally been accomplished using an analog diode or mixer. Such devices may not accurately emulate high order IM products, expected with OFDM signals. Further, for optimum CPD detection, a vacant part of the upstream spectrum should be used, because the relatively high level of upstream QAM data carriers (formed by cable modems) may interfere with typically low level CPD echo signals. Generally, the vacant part of the upstream spectrum is 5 to 20 MHz, but this part of the spectrum is noisy due to ingress. Ingress can limit the sensitivity of the CPD radar. If the bandwidth of the CPD radar is limited to minimize ingress, the limited bandwidth will limit the sensitivity and time delay resolution of the CPD radar. Moreover, in a CCAP network architecture, downstream signals used to emulate the CPD echo signal will have to be obtained from multiple CMTS's (because each CMTS may produce a relatively unique package of downstream narrowcast signals). This could require extra equipment (e.g., multiple CPD radar units and return path switches) to be installed at the headend of the network or at distributed points between the headend and the fiber nodes. Such extra equipment would require extra space and power consumption. In some cases, for example, in a Fiber Deep system proposed by Aurora Networks, Santa Clara, Calif. (www.aurora.com), where the CMTS card is installed directly at the fiber node, convenient connection to upstream test points to receive CPD echo signals may be impossible.

According to the CableLabs® Proactive Network Maintenance (PNM) specification (http://www.cablelabs.com/specification/proactive-network-maintenance-using-pre-equalization/), entitled DOCSIS® Best Practices and Guidelines, Proactive Network Maintenance Using Pre-Equalization, CM-GL-PNMP-V02-110623, Jun. 23, 2011, the detection of any impairment in an HFC network is preferably performed at the CMTS or cable modem (CM):

"The CMTS and CM contain test points which include essential functions of a spectrum analyzer, vector signal analyzer (VSA), and network analyzer, while the cable plant is considered the Device Under Test (DUT). The goal is to rapidly and accurately characterize, maintain and troubleshoot the upstream and downstream cable plant, in order to guarantee the highest throughput and reliability of service." The concept of using CMTS's and CMs for network maintenance is very reasonable, cost effective, and may be the best solution for HFC networks with CCAP architecture.

Detection methods of nonlinear distortions in the downstream and upstream spectrums have been recently proposed and are described in the following CableLabs® documents: (1) Testing Nonlinear Distortion in Cable Networks, by Thomas Williams and Belal Hamzeh, CableLabs, 2013; (2) Field Measurements of Nonlinear Distortion in Digital Cable Plants, by Thomas Williams and Belal Hamzeh, CableLabs, Ronald Hranac, Cisco Systems, 2013; (3) Cable Network Management Infrastructure Evolution, by L. Alberto Campos, Jennifer Andreoli-Fang and Vivek Ganti, CableLabs, 2014; and (4) Proactive Network Maintenance Using Pre-Equalization, DOCSIS® Best Practices and Guidelines, CM-GL-PNMP-VO2-110623, CableLabs 2011. The first two documents describe a method of detecting downstream nonlinear distortions by first capturing samples of the full downstream spectrum at CMs and using the samples to emulate (or "manufacture") second and third order CPD distortion signals and then cross-correlating the emulated distortion signals with a portion of the downstream spectrum (presumably containing actual CPD distortion signals) in a "vacant" band (i.e., no downstream commercial signal traffic). The second and third order CPD distortion signals are known as composite second order (CSO) and composite triple beat (CTB), respectively. Theoretically, the method of the first two documents can be used to predict the CPD condition in the upstream spectrum as well, because second and third order CPD distortion affect both downstream and upstream spectrums (i.e., high and low frequency IM products). However, in reality, it is not so simple. For instance, such a predictive method does not yield an actual CPD level in the upstream spectrum, because the relative CPD level in the upstream depends on the upstream signal level at the CPD source. For example, very often CPD appears at the output of an amplifier or a nearby passive, where the downstream signal level is high. At these points, a relatively low level second order IM product in the downstream may result in a relatively high CPD level in the upstream, because the upstream signal level is generally at a minimum at these points.

Also, with respect to the above predictive method, the level of second order IM products in the vacant downstream detection band do not, generally, correlate with the level of the second order IM products in the upstream, because the second order IM products in the downstream include harmonics of the downstream carriers ($2f1$, $2f2$ ... $2fn$), while CPD in the upstream is formed from IM difference products between downstream carriers ($f2-f1$) only. Further, the level of third order IM products in the downstream cannot be used as a reliable indicator of CPD, because third order IM is generated at all amplifiers and only those amplifiers with, e.g., a poor performing diplex filter will produce CPD. Thus, in general, one cannot distinguish, among all amplifiers, which one is the CPD source. Lastly, the above predictive method does not directly identify a correct number and location of the CPD sources in the node.

The second CableLabs® document listed above also describes a method of detecting nonlinear distortion in the upstream spectrum from upstream signals. The idea is to use a statistical correlation of energy in a vacant upstream band during transmission of upstream burst signals. This method detects nonlinear distortions of upstream signals, whether or not those distortions are produced by a CPD source. That is, the method does not distinguish between nonlinear distortions from, e.g., CPD and amplifiers operating in a nonlinear region. Also, due to a higher signal level in the downstream (compared to upstream) and a much higher total energy of the downstream signals, the level, probability, and impact of CPD distortion in the upstream from downstream signals are often higher than of nonlinear distortions (generally) in the upstream from upstream signals.

Referring now to the third and fourth CableLabs® documents listed above, they describe a method of using pre-equalization between CMs and CMTS's, for detecting and locating linear distortions. This method is part of a scheme called Proactive Network Maintenance (PNM), and is addressed in detail in the fourth CableLabs® document. The fourth document mentions that even impairments considered "nonlinear" such as CPD may have associated linear distortion elements. This is true in the sense that a nonlinear element, such as a corroded center conductor, may also create an impedance mismatch, which may generate a micro-reflection (a linear distortion). But, relying on whether a nonlinear element also has a linear distortion associated with it, is an indirect and imperfect assessment. For example, a saturated amplifier, operating in a nonlinear region, generally would not have a linear distortion element associated with it. A pre-equalization method does make sense as a second step, after CPD source candidates are identified in a first, more direct step. For instance, the pre-equalization method may be used in a second step to reduce the number of CPD candidates identified in the first step (e.g., those candidates that do not have a linear component, as determined under the second step, may be eliminated as a potential CPD source).

OBJECTS AND SUMMARY OF THE INVENTION

It is therefore an object of the present invention to detect CPD in an HFC network with a CCAP architecture using CMTS's and CMs as measuring test points, consistent with a Proactive Network Maintenance (PNM) scheme.

It is another object of the present invention to provide a cross-correlation system or method of detecting CPD by using synchronous capture at the CMTS's of downstream and upstream OFDM symbols, within a time interval of expected CPD echo signals.

It is a further object of the present invention to provide a cross-correlation system or method of detecting CPD by using synchronous capture at the CMTS's of downstream OFDM symbols and time-domain samples of upstream quiet signals, within a time interval of expected CPD echo signals.

It is still another object of the present invention to provide a cross-correlation system or method of detecting CPD by using time-domain samples of downstream signals captured by CMs (according to trigger messages carried in downstream OFDM signals) and time-domain samples of upstream quiet signals captured by the CMTS's, within a time interval of expected CPD echo signals.

These and other objects are attained in accordance with the present invention, wherein there is provided, in a first embodiment, a system or method for detecting a CPD source in an HFC network having a CMTS that transmits OFDM signals in a downstream frequency band of the network and receives OFDM signals in an upstream frequency band of the network. The CPD source generates a CPD echo signal in the upstream frequency band from the OFDM signals in the downstream frequency band. The system or method comprises means for or steps of: (a) synchronously acquiring a frequency domain version of a downstream OFDM symbol; (b) converting the frequency domain version of the downstream OFDM symbol to a time-domain version of the downstream OFDM symbol; (c) up-sampling and up-converting the time-domain version of the downstream OFDM symbol, to produce an RF downstream OFDM symbol in the downstream frequency band; (d) emulating separately even and odd order IM distortion products from the RF downstream OFDM symbol; (e) synchronously acquiring an upstream quiet OFDM symbol, during a quiet period and within a time interval sufficient to receive the CPD echo signal; (f) up-sampling and up-converting the upstream quiet OFDM symbol, to produce an RF upstream quiet OFDM symbol in the upstream frequency band; (g) cross-correlating the RF upstream quiet OFDM symbol with the emulated even and odd order IM distortion products to produce even and odd order cross-correlation functions, respectively; (h) coherently accumulating, separately, a multiplicity of even order cross-correlation functions and a multiplicity of odd order cross-correlation functions, where the multiplicity of even and odd order cross-correlation functions are produced from a corresponding multiplicity of RF downstream OFDM symbols and a corresponding multiplicity of RF upstream quiet OFDM symbols; (i) calculating an even order cross-correlation envelope from the accumulated even order cross-correlation functions and an odd order cross-correlation envelope from the accumulated odd order cross-correlation functions; and (j) detecting the CPD echo signal from either or both of the even and odd order cross-correlation envelopes by the presence of a peak in either or both of the envelopes, whereby the CPD source is detected by the detection of the CPD echo signal. The system or method may further comprise means for or steps of: (k) measuring a time delay value associated with the CPD echo signal by examining the position of the peak in either or both of the envelopes; and (l) determining a location or a plurality of candidate locations of the CPD source in the HFC network based on the time delay value associated with the CPD echo signal.

A second embodiment of the present invention has the same first four elements or steps as the first embodiment, i.e., elements or steps (a) through (d). A primary difference of the second embodiment is in element or step (e), where, in the second embodiment, RF upstream signals (in an upstream frequency band or channel) are synchronously acquired during a quiet period ("RF upstream quiet signals"), instead of an upstream quiet OFDM symbol. The remaining elements or steps in the second embodiment are also similar to the first embodiment, except that there are no up-sampling and up-converting of an upstream signal in the second embodiment, because the RF upstream quiet signals are already at the desired RF frequencies. The remaining elements or steps of the second embodiment are: (f) cross-correlating the RF upstream quiet signals with the emulated even and odd order IM distortion products to produce even and odd order cross-correlation functions, respectively; (g) coherently accumulating, separately, a multiplicity of even order cross-correlation functions and a multiplicity of odd order cross-correlation functions, where the multiplicity of even and odd order cross-correlation functions are produced from a corresponding multiplicity of RF downstream OFDM symbols and a corresponding multiplicity of acquisitions of RF upstream quiet signals in the upstream frequency band; (h) calculating an even order cross-correlation envelope from the accumulated even order cross-correlation functions and an odd order cross-correlation envelope from the accumulated odd order cross-correlation functions; and (i) detecting the CPD echo signal from either or both of the even and odd order cross-correlation envelopes by the presence of a peak in either or both of the envelopes, whereby the CPD source is detected by the detection of the CPD echo signal. As in the first embodiment, the second embodiment may further include elements or steps to: (j) measure a time delay associated with the CPD echo signal by examining the position of the peak in either or both of the envelopes; and (k) determine a location or a plurality of candidate locations of the CPD source in the HFC network based on the time delay associated with the CPD echo signal.

In a third embodiment of the present invention, a system or method for detecting a CPD source in an HFC network is provided. The HFC network has a CMTS that transmits OFDM signals to a CM in a downstream frequency band of the network and receives OFDM signals from the CM in an upstream frequency band of the network. The CPD source generates a CPD echo signal in the upstream frequency band from the OFDM signals in the downstream frequency band. The system or method comprises means for or steps of: (a) synchronously acquiring digital RF downstream signals in the downstream frequency band; (b) emulating separately second and third order IM distortion products from the digital RF downstream signals; (c) synchronously acquiring RF upstream quiet signals in the upstream frequency band during a quiet period and within a time interval sufficient to receive the CPD echo signal; (d) cross-correlating the RF upstream quiet signals with the emulated second and third order IM distortion products to produce second and third order cross-correlation functions, respectively; (e) coherently accumulating, separately, a multiplicity of second order cross-correlation functions and a multiplicity of third order cross-correlation functions, where the multiplicity of second and third order cross-correlation functions are produced from a corresponding multiplicity of acquisitions of digital RF downstream signals in the downstream frequency band and a corresponding multiplicity of acquisitions of RF upstream quiet signals in the upstream frequency band; (f) calculating a second order cross-correlation envelope from the accumulated second order cross-correlation functions and a third order cross-correlation envelope from the accumulated third order cross-correlation functions; and (g) detecting the CPD echo signal from either or both of the second and third order cross-correlation envelopes by the presence of a peak in either or both of the envelopes, whereby the CPD source is detected by the detection of the CPD echo signal. As in the first and second embodiments, the third embodiment may further include elements or steps to: (h) measure a time delay associated with the CPD echo signal by examining the position of the peak in either or both of the envelopes; and (i) determine a location or a plurality of candidate locations of the CPD source in the HFC network based on the time delay associated with the CPD echo signal.

BRIEF DESCRIPTION OF THE DRAWING

Further objects of the present invention will become apparent from the following description of preferred embodiments with reference to the accompanying drawing, in which:

FIG. 4 is a matrix comparing different embodiments of the present invention;

DETAILED DESCRIPTION OF THE PREFERRED EMBODIMENT

Figure 1:
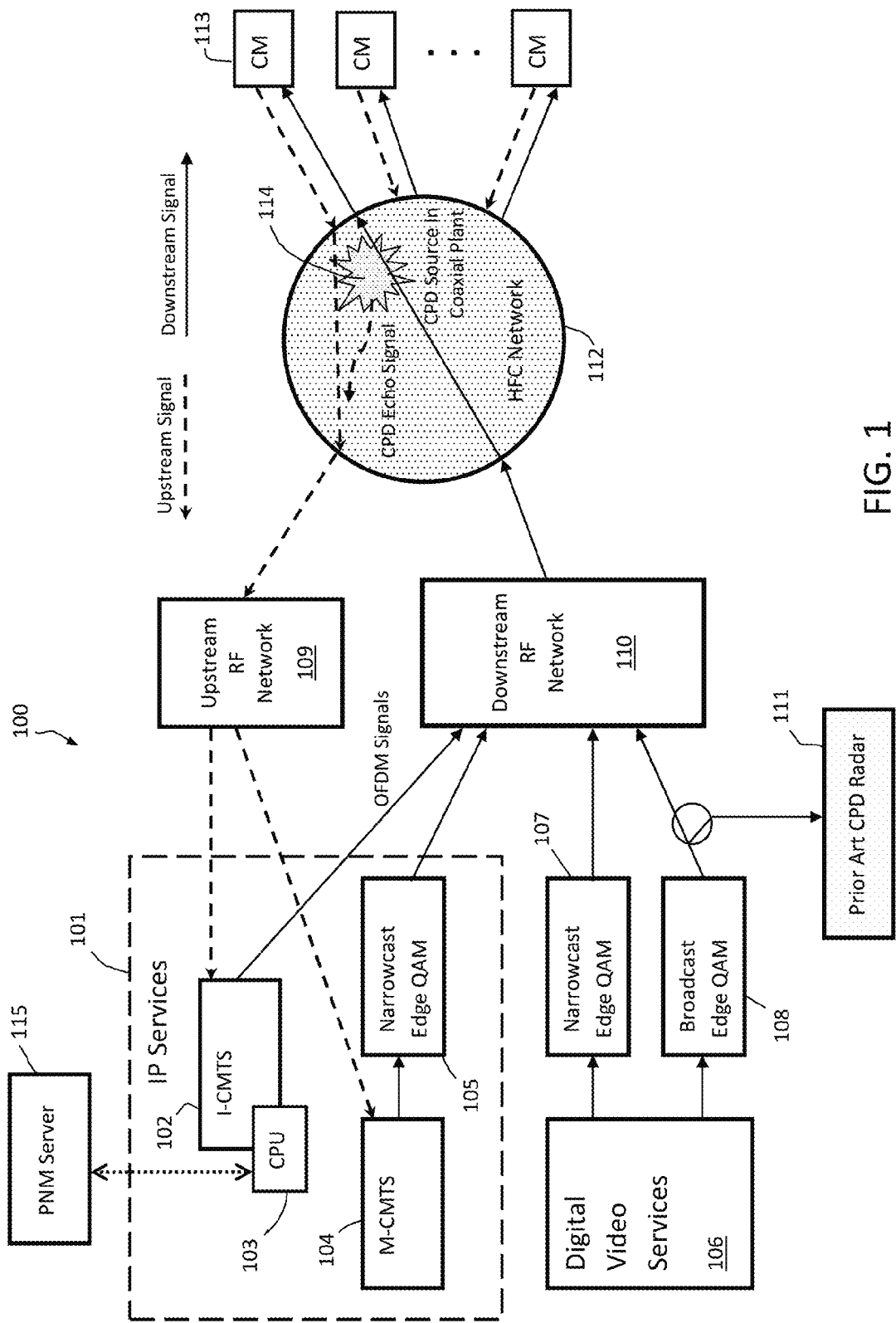
FIG. 1 is a block diagram of a cable television network system with a CCAP architecture, incorporating a system and method for detecting and locating CPD sources in accordance with the present invention.

Referring to FIG. 1, there is shown is a block diagram of a cable television network system 100 incorporating the present invention for detecting and locating CPD sources in a coaxial cable portion of system 100. System 100 comprises a headend (101-108) having a transitional or hybrid architecture, comprising elements of both conventional and CCAP architectures. The headend of system 100 includes two main service platforms: DOCSIS IP services 101 and digital video services 106 (e.g., switched digital video (SDV) and video on demand (VOD)). Digital video services 106 are distributed into a downstream RF network 110 via narrowcast edge QAM modulators 107 and broadcast edge QAM modulators 108. The other inputs of downstream RF network 110 receive DOCSIS QAM and OFDM signals from DOCSIS IP service platform 101. The DOCSIS digital signals are narrowcast signals (unique for each node). The DOCSIS QAM signals are formed by a narrowcast edge QAM modulator 105, which is connected to a modular CMTS (M-CMTS) 104. For each node, the OFDM signals are formed by an integrated CMTS (I-CMTS) 102. I-CMTS 102 can also form DOCSIS QAM signals and, with full implementation of CCAP architecture, I-CMTS 102 will also form digital video service QAM channels as well. In other words, the goal of full CCAP architecture is to provide a universal I-CMTS platform, combining all services and signals. In a variation of CCAP architecture, the I-CMTS may be deployed to the fiber node (e.g., as in the Fiber Deep concept proposed by Aurora Networks, Santa Clara, CA), and all services are delivered to the I-CMTS via fiber and GB Ethernet. Thus, in view of the role of CMTS's, such as I-CMTS 102, in a system transitioning to CCAP architecture (FIG. 1) and in a full CCAP architecture system, CMTS's and the signals produced thereby are chosen for the present invention for CPD detection.

Again referring to FIG. 1, all downstream QAM and OFDM signals are combined at downstream RF network 110. The combined downstream signals are then transmitted to an HFC network 112 and ultimately received (via DOCSIS channels) by CMs 113 at subscribers' premises. The upstream DOCSIS channel signals from CMs 113 are transmitted to HFC network 112 and then received by an upstream RF network 109. The upstream signals are then routed to M-CMTS's 104 and I-CMTS's 102. At a CPD source 114 in HFC network 112, the upstream signals combine with CPD-generated low frequency IM products of the downstream signals. According to the CableLabs® PNM concept, HFC network 112 is considered a Device Under Test (DUT) and I-CMTS's 102 and CMs 113 are considered test points for measuring different types of impairments in network 112. I-CMTS 102 and CMs 113 capture samples of downstream and upstream signals and stores this data in a memory of a computer or micro-controller (CPU) 103, and then a PNM server 115 retrieves the data for analysis. This is a very general description of the PNM scheme.

FIG. 1 shows a CPD radar 111 constructed in accordance with U.S. Pat. Nos. 7,415,367 and 7,584,496, which are both incorporated herein by reference. CPD radar 111 may be, e.g., a Hunter® CPD radar system supplied by Arcom Digital, LLC, Syracuse, N.Y. As an example, CPD radar 111 is coupled to network system 100 at a test point downstream of broadcast edge QAM modulators 108. CPD radar 111 uses broadcast QAM signals only. Narrowcast signals are not used by radar 111, because, by design, such signals are unique to each node and samples of the narrowcast signals would have to be obtained for each node. Thus, in the system architecture shown in FIG. 1, a significant amount of downstream signal energy (e.g., from narrowcast signals) would not be utilized by CPD radar 111 in conducting CPD detection. Therefore, it is an object of the present invention to be able to utilize all or most of the downstream signal energy for CPD detection and location.

It should be noted that a key feature of a DOCSIS 3.1 specified HFC network carrying OFDM signals is a strong time and frequency synchronization of the OFDM signals between I-CMTS 102 and CMs 113. Such signal synchronization is achieved using a 10.24 MHz master clock synchronized with a GPS clock, via the Precision Time Protocol (PTP) defined in the IEEE-1588 standard. Generally, this standard provides synchronizing to better than 100 nanoseconds. This feature means that signals received and formed by CMs 113 and signals received and formed by I-CMTS 102 are coherent. Therefore, this feature makes it possible to implement, according to the present invention, coherent cross-correlation detection of CPD.

The nonlinear characteristics of a CPD source in HFC network 112 can be described by the following equation (1), which is a Taylor series:

$$S(t) = A1x(t) + A2x(t)^2 + A3x(t)^3 + A4x(t)^4 + A5x(t)^5 \quad (1)$$

where S(t) is the signal at the output of the nonlinear element (CPD), and x(t) is the input signal. A1, A2, A3, A4 . . . are coefficients, where A1 is the fundamental coefficient or input signal amplitude, A2 is a second order distortion coefficient, A3 is a third order distortion coefficient, and A4, etc. are higher order distortion coefficients. The even coefficients A2, A4, etc. correspond to the even IM products and the odd coefficients A3, A5, etc. correspond to the odd IM products of the CPD distortion or echo signal.

Figure 2:
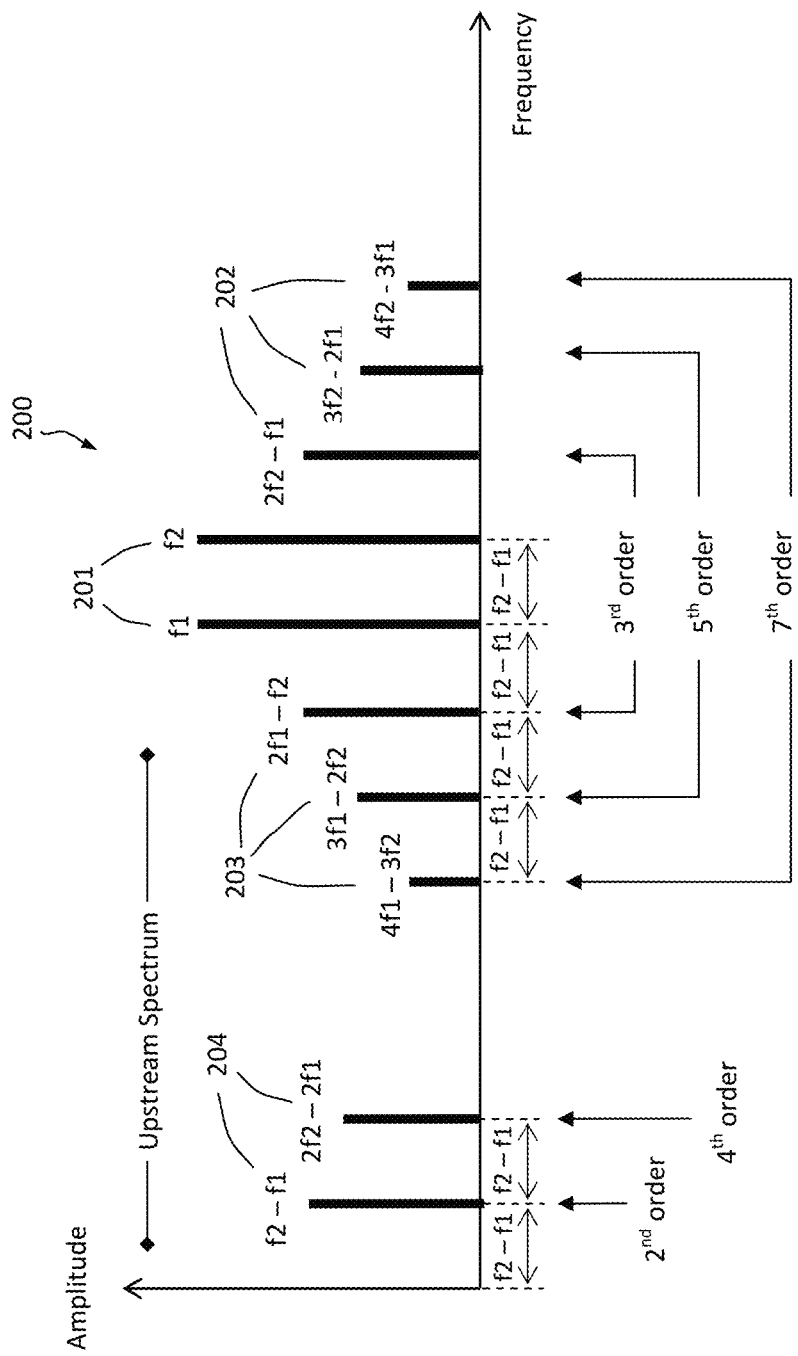
FIG. 2 is a spectrum plot of intermodulation (IM) distortion products between two tone or CW signals, formed by a nonlinear impairment or element in the path of the signals.

Referring now to FIG. 2, there is shown a spectrum 200 of IM distortion products from two continuous wave (CW) input signals 201 at frequencies f1 and f2, formed by a nonlinear element in the path of the two signals (simple case). In the context of equation (1), x(t) is the combination of CW signals 201. The even order difference IM products 204 at f2−f1 and 2f2−2f1 fall within the lower part of the spectrum, which is part of the upstream spectrum of the HFC network. The other even order IM products at frequencies 2f1, 2f2 and f1+f2 (not shown) fall within the upper part of the spectrum, which is part of the downstream spectrum of the HFC network. The odd order difference IM products 202 and 203 are symmetrically grouped around CW signals 201. As understood from FIG. 2, if CW signals 201 are close to the upstream spectrum the odd order difference IM products 203 may also impact the upstream spectrum.

Figure 3:
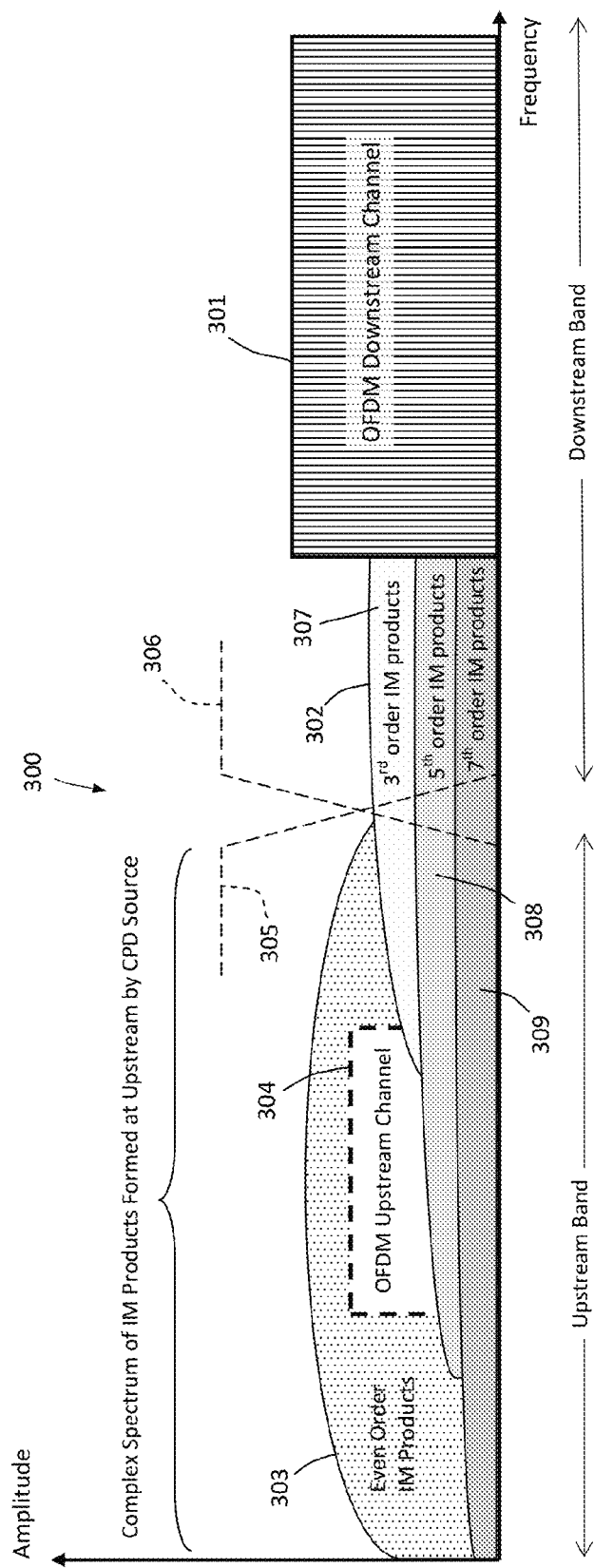
FIG. 3 is an illustration of the upstream and downstream spectrums of an HFC network, showing IM distortion products of OFDM signals carried by the network, formed by a CPD source in the network.

In FIG. 3, a more complicated case is illustrated. A spectrum 300 contains a downstream wide bandwidth OFDM signal 301, odd order IM products 302, even order IM products 303, and an upstream OFDM channel 304. Spectrum 300 includes upstream and downstream bands (or spectrums) 305, 306 of an HFC network. As is well understood and described in the DOCSIS 3.1 specification, signal 301 contains a large number of subcarriers and its channel bandwidth can be as wide as 192 MHz. IM products 302 and 303 are formed from signal 301 at a typical CPD source (not shown). Upstream OFDM channel 304 is the receive channel of I-CMTS 102. Second order IM products 303 are distributed over a band of frequencies from 0 to up to 192 MHz (corresponding to the bandwidth of signal 301). Second order products 303 will definitely impact the full upstream band, even in a 204 MHz mid split system (DOCSIS 3.1 specification). The impact of odd order IM products 302 on the upstream band (and particularly band 304) will depend on the location of downstream OFDM signal 301 in the RF spectrum. Odd order IM products 302 include third order products 307, fifth order products 308, and seventh order products 309. Only a small part of third order products 307 extend into upstream OFDM channel 304, while fifth and seventh order products 308 and 309 extend through the entire bandwidth of channel 304.

In general, both even and odd order IM products are formed at a CPD source and the level or amplitude of the products decreases with increasing order. But, the relationship between even and odd order IM products depends on the particular characteristics of the nonlinear element in the signal path. Also, in many cases, CPD is generated at a saturated bi-directional amplifier having a diplex filter with poor rejection in the upstream band. Most amplifiers used in an HFC network are based on a push-pull design having a balanced output stage, which results mainly in odd order distortion products at saturation. Thus, generally, it is difficult to propose an adequate model addressing both even and odd ordered IM products for a wide range of nonlinear elements. Therefore, the present invention performs an analysis of upstream even and odd order IM products separately.

In accordance with the present invention, I-CMTS 102 (FIG. 1) captures downstream OFDM symbols or samples of all or most of the signals in the downstream spectrum ("full-band downstream signal samples"). In a variation of this, the full-band downstream signal samples are captured by CMs 113 and retrieved by I-CMTS 102. Downstream OFDM symbols or full-band samples are then used for emulation of the even and odd ordered IM products in the upstream spectrum, including upstream OFDM channel 304. The emulated IM products are in the form of signal samples and are referred to as reference samples. As will be explained further below, the reference samples are cross-correlated with an upstream quiet OFDM symbol or samples of all or most of the upstream signals in the upstream spectrum ("full-band upstream signal samples") to detect the actual CPD IM products (or "CPD echo signal"). The reference samples are created by CPU 103 or PNM server 115. Separate reference samples are created for the even ordered IM products and for the odd ordered IM products. I-CMTS 102 captures the upstream OFDM symbol or full-band upstream samples during a quite period (see DOCSIS 3.1), i.e., when no carriers are transmitted in the upstream spectrum by CMs 113. The capture of upstream OFDM symbols or full-band upstream samples is performed at predetermined time intervals, corresponding to the expected time delay of the CPD echo signal. The minimum expected time delay corresponds to the round-trip propagation time of a signal between I-CMTS 102 and an associated fiber node. The maximum expected time delay corresponds to the round-trip time of a signal between I-CMTS 102 and the last passives in the coaxial plant of a particular node. The minimum and maximum time delays can be measured or calculated by using electronic maps. Samples of the captured upstream symbols or the full-band upstream signal samples are cross-correlated (in CPU 103 or PNM server 115) with the reference samples of emulated even and odd IM products, and the CPD echo signal is detected by a peak in the resulting cross-correlation functions. It should be noted that, according to the DOCSIS 3.1 specification, both CMTS's and CMs capture OFDM symbols and samples of the downstream and upstream spectrums at scheduled moments in time. Thus, the preferred embodiments of the present invention work with the existing functionality and protocol of the CMTS's and CMs.

Referring now to FIG. 4, there is shown a matrix comparing three different embodiments of the present invention. The primary difference between the embodiments concerns the types of downstream and upstream signals captured by the CMTS's and CMs for carrying out CPD detection. Two types of downstream signals are used to emulate CPD IM products and create reference samples: (1) downstream OFDM symbols captured at the CMTS before the symbols are converted to the time-domain by an inverse discrete Fourier transform (IDFT); or (2) full-band downstream time-domain signal samples captured at CMs 113 or at I-CMTS's 102. Note, the DOCSIS 3.1 specification requires the CMs to capture full-band downstream time-domain samples, and such capability is already realized in current DOCSIS 3.0 compliant CMs using Broadcom® chipsets BCM312x and BCM3383 supplied by Broadcom Corporation, Irvine, Calif. Capture of full-band downstream time-domain samples at the CMTS's is not required by current DOCSIS specifications, but vendors of CMTS's can implement this capability without difficulty because the full-downstream spectrum at the I-CMTS is formed and in digital form in the I-CMTS's. Thus, full-band downstream OFDM time-domain samples are potentially accessible at the I-CMTS's for detection of CPD according to the present invention.

The current DOCSIS 3.1 specification does not define a triggering mode of capturing full-band downstream samples at the CMs, but it does require capturing time-domain samples of the downstream OFDM symbols marked by a trigger message contained in the data of the Physical layer Link Channel (PLC) portion of the downstream OFDM signal (see DOCSIS 3.1 specification for structure of OFDM signal). Thus, the triggering of the capture of full-band downstream samples is potentially available in DOCSIS 3.1 compliant CMs.

In a preferred embodiment of the present invention, downstream signals, in one form or another, are used as a probe signal in a CPD radar system. In the preferred embodiment, no external test or probe signals are injected into the HFC network. Full-band downstream time-domain samples contain the full energy of the downstream signals; thus, this type of sampling would be desirable for the CPD radar of the present invention. Full-band downstream time-domain samples generate a relatively sizable amount of data and, if acquired at the CMs, would generate extra signal traffic in the retrieval of the data from the CMs. In a variation of this embodiment, the samples are acquired at the CMTS's, thus minimizing or eliminating signal traffic otherwise necessary to retrieve data from the CMs. This variation can be easily realized with the cooperation of CMTS vendors. The other type of downstream signal sampling is to sample the downstream OFDM symbols at the CMTS before they are converted to the time-domain. The downstream OFDM symbols bandwidth is wide enough (up to 192 MHz) to contain enough energy to function as a probe signal for cross-correlation detection of CPD. In fact, the DOCSIS 3.1 specification permits the placing of two 192 MHz OFDM symbols in the downstream spectrum. Thus, it may be possible to obtain samples of downstream OFDM symbols covering 384 MHz bandwidth (2×192). An advantage of using samples of the OFDM symbols (before IDFT) is that these samples are available at the CMTS's, according to the DOCSIS 3.1 specification.

The difference between the embodiments of the present invention also depends on the signals captured in the upstream spectrum (expected to contain the CPD echo signal or signals). The embodiments currently contemplate two possible scenarios: (1) capture samples within upstream channel 304 (FIG. 3) of a quiet probe OFDM symbol at the CMTS (see DOCSIS 3.1, Section 9.4.1); and (2) capture full-band upstream time-domain samples at the CMTS during a quiet period (see DOCSIS 3.1, Section 9.4.2). Note that, according to the DOCSIS 3.1 specification, the CMTS must capture both types of upstream signal samples—(1) and (2) above. Scenario (2) is more preferable for detection of CPD, because of the wider bandwidth and higher energy of the full-band signals. However, with the adoption of CCAP architecture and the use of I-CMTS's with OFDM signals, where the I-CMTS's will capture wide bandwidth upstream OFDM symbols, scenario (1) will be almost equivalent to scenario (2).

In summary, three embodiments of the present invention, are: (1) capture samples of downstream OFDM symbols before IDFT (allocated for channel 301), and capture samples of upstream quiet probe OFDM symbols from channel 304; (2) capture samples of downstream OFDM symbols before IDFT (allocated for channel 301), and capture full-band upstream time-domain samples at the CMTS during a quiet period; and (3) capture full-band downstream time-domain samples at the CMs or CMTS's, and capture full-band upstream time-domain samples at the CMTS during a quiet period. The first embodiment provides very accurate emulation of the CPD IM products (i.e., CPD echo signal) in the form of reference samples; however, signal energy is limited by the bandwidth of OFDM downstream channel 301 and OFDM upstream channel 304 (which, as discussed, may not be a performance limitation).

The second embodiment provides very accurate emulation of the CPD echo signal and the use of the full upstream spectrum signal energy; however, downstream signal energy is limited by the bandwidth of OFDM downstream channel 301. The third embodiment provides accurate emulation of the CPD echo signal and the use of the full downstream and upstream spectrum signal energy; however, in the case of obtaining samples from the CMs, additional time is required for retrieving the samples and additional signal traffic is created. The third embodiment is probably the most preferable for detection of CPD, but may require modifications to the CMTS's and CMs and the cooperation of CMTS and CM vendors. Again, these embodiments are summarized in the matrix of FIG. 4.

Figure 5:
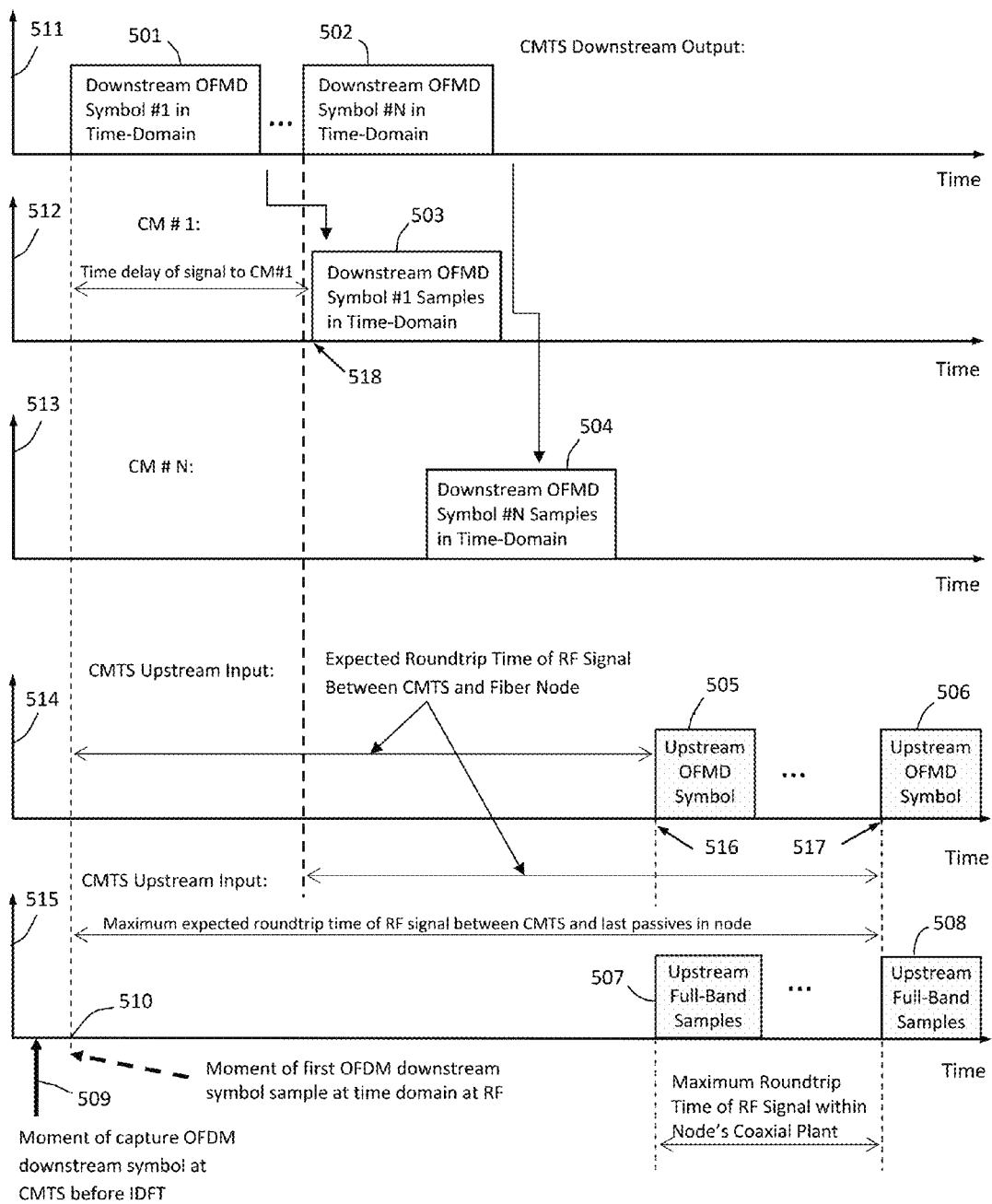
FIG. 5 is a timing diagram illustrating the synchronous capture of downstream and upstream signals at the CMTS's and CMs.
Figure 6:
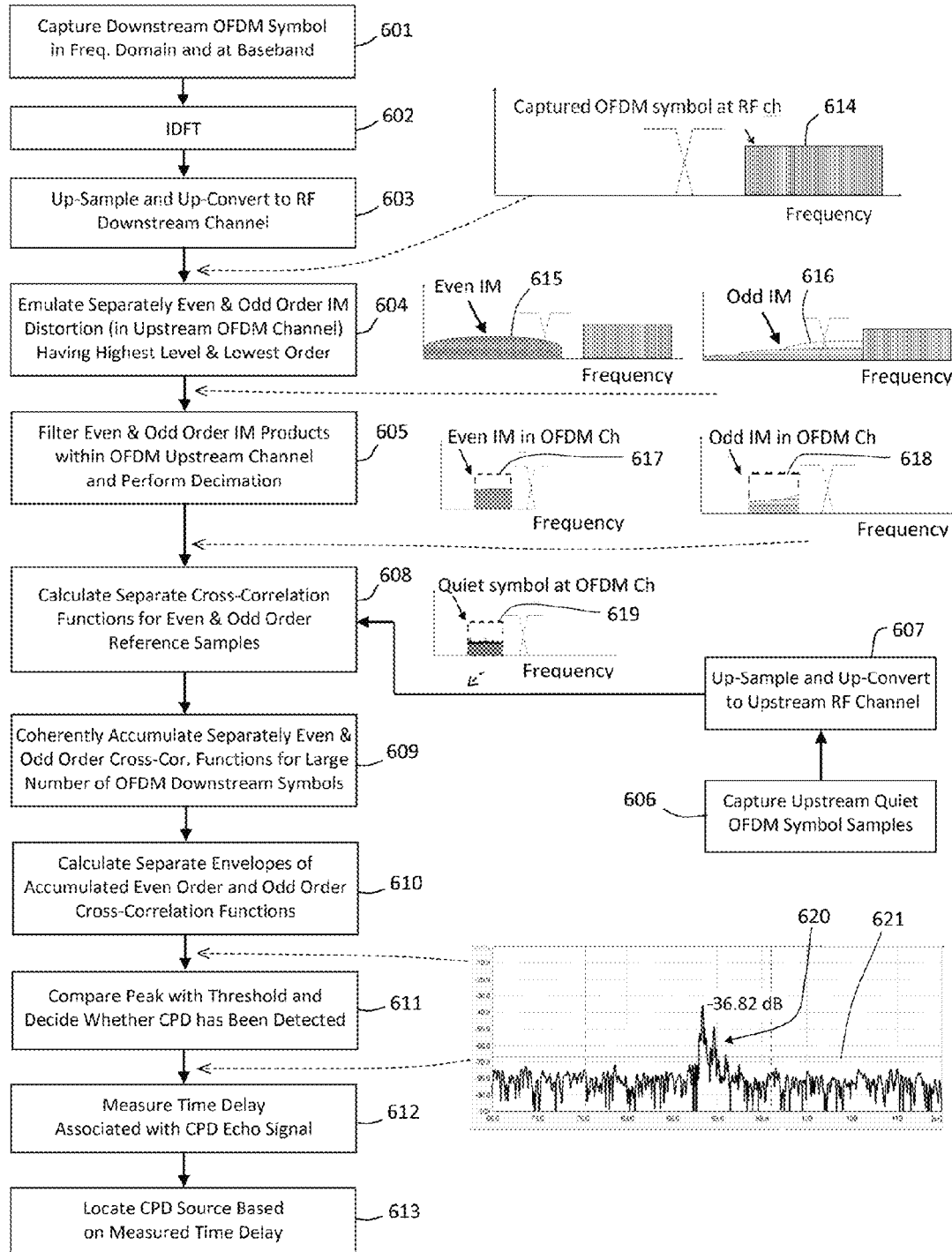
FIG. 6 is a flow diagram, with illustrations, outlining a first embodiment of the present invention, based on the synchronous capture by CMTS's of downstream and upstream OFDM symbols.

Referring now to FIG. 5, there is shown a series of time diagrams 511-515, illustrating the timing of the capture of downstream and upstream OFDM signals at the CMTS's and CMs, in accordance with specific embodiments of the present invention. Time diagrams 511 and 514 correspond to the first embodiment, and FIG. 6 is a flow diagram outlining the method of the first embodiment. Preferably, the method of FIG. 6 is implemented in PNM server 115 or in CPU 103 of a CMTS (e.g., I-CMTS 102 in FIG. 1). For convenience, and as an example, PNM server 115 (in conjunction with an associated CMTS and CM) is chosen as the host for carrying carry out the methods of the first, second and third embodiments (unless otherwise stated). In a first step 601 (FIG. 6), a first OFDM symbol 501 is captured by a CMTS and then acquired by PNM server 115 at a moment in time 509 (FIG. 5). Symbol 501 is in the so-called frequency-domain and at baseband when it is captured or acquired. That is, it is captured before it is converted to a time-domain symbol by an IDFT operation. A moment 510 (FIG. 5) is the moment an RF time-domain version of symbol 501 is transmitted downstream from the CMTS. The time between moment 509 and 510 includes the time for CMTS to: (1) perform an IDFT, converting frequency-domain symbol 501 to a time-domain symbol; (2) append a cyclic prefix (interval) to the time-domain version of symbol 501 (at baseband); and (3) up-sample and up-convert the time-domain version of symbol 501 to RF (see DOCSIS 3.1, spec., e.g., sections 7.5.2.8, 7.5.2.9, & 7.5.8). Moment 510 is determined (for a particular CMTS) from moment 509, which is known. Moment 509 is known and the interval between moments 509 and 510 is known. Thus, moment 510 is known.

In a second step 602 (FIG. 6), PNM server 115 performs an IDFT calculation on symbol 501 with a sampling rate of 204.8 MHz, according to the DOCSIS 3.1 specification. In a third step 603 (FIG. 6), the time-domain version of symbol 501 (output of IDFT) is up-sampled by an integer multiple from 204.8 MHz to a higher sampling rate (e.g., 2048 MHz) and up-converted to an RF downstream frequency channel, e.g., frequency channel 301 in FIG. 3. Up-sampling of symbol 501 is done so that it can be up-converted to an RF downstream frequency, which may be as high as 1 GHz or even higher. The up-conversion is accomplished by using a well-known quadrature up-conversion process. The local oscillator frequency for up-conversion is known at CPU 103 of I-CMTS 102 and at PNM server 115. The up-converted RF OFDM symbol is shown in a frequency plot in FIG. 6, as a signal 614. Note, constructed signal 614 is absolutely coherent with the actual RF OFDM symbol formed at I-CMTS 102, due to the use of coherent clocks in I-CMTS 102 and server 115. In a fourth step 604, odd and even order IM products are emulated separately from signal 614. As indicated earlier, separate emulation of odd and even order IM products is preferred, in order to detect different types of CPD sources, such as those with strong third order characteristics, e.g., when A3>A2 in equation (1). As indicated, the third-order IM scenario is typical where CPD is generated at a saturated push-pull amplifier having a diplex filter with poor return rejection performance.

It is well known that, generally, the level or amplitude of IM products decreases with increasing order. Studies have shown that going from third to fifth order and from fifth to seventh order, the level of the odd order IM products drops by −8 db to −34 dB. See, e.g., Control of Passive Intermodulation Products, International Telecommunications Union RadioCommunication Bureau Report 1049-1, 1990, pp. 229-34, www.itu.int/dms_pub/itu-r/opb/rep/R-REP-M.1049-1-1990-PDF-E.pdf. The same relation is valid or expected for even order IM products. Because the variation in level between adjacent odd order IM products and adjacent even order IM products can be so large (e.g., 26 dB), it was decided that only the predominant odd and even order IM products (i.e., those with the highest levels) be used in the cross-correlation step of the preferred embodiments. In the first embodiment (FIG. 6), the frequency band that is analyzed for IM products is upstream OFDM channel 304 (FIG. 3). Thus, in this embodiment, before the IM products are emulated, the predominant odd and even order CPD IM products expected to be received by the CMTS (e.g., I-CMTS 102) in upstream band 304 must be identified, and then based on those, the IM products with the lowest order and highest level are selected for emulation. The analysis may be conducted initially based on system parameters (e.g., upstream and downstream channels, bandwidths and frequencies of channels and signals, etc.), or an ongoing analysis of the upstream channel or spectrum may be done to determine currently predominant IM products for emulation. The analysis is performed in CPU 103 or server 115.

In emulating even order IM products, if the downstream OFDM signal has a maximum DOCSIS 3.1 specified bandwidth of 192 MHz, then the second order IM products will have the highest level within the full upstream spectrum (see FIG. 3). To emulate the second order IM products, samples of signal 614 should be "distorted" by using equation (1), where A2=1 and all other coefficients are zero. If the downstream OFDM signal has a minimum DOCSIS 3.1 specified bandwidth of 24 MHz, then the second order IM products will extend up to 24 MHz only. And, if upstream channel 304 is located higher than 24 MHz (e.g., from 30 to 40 MHz), then the highest level even order IM products impacting channel 304 will be the fourth order. In the latter case, A4=1 and all other coefficients are zero in equation (1). If upstream channel 304 partially overlaps the second order IM products, then both second and fourth order IM products should be included in the emulation. In the latter case, it may be assumed that the difference in level between second and fourth order is 10 dB (a typical value). Thus, the following coefficients in equation (1) should be used: A2=1; A4=0.1; and all other coefficients are set to zero. The emulated even order IM products are schematically shown in unfiltered form in a frequency plot in FIG. 6, as a signal 615.

In emulating odd order IM products, the logic in selecting the IM products and coefficients A3, A5, A7 . . . in equation (1) is the same as for the even order. However, in the case where odd IM products overlap upstream OFDM channel 304, the minimum and maximum RF frequencies of the downstream subcarriers in signal 614 should be considered in modeling the odd order products. This is done by using the simple case of two CW carriers producing distortion, as in FIG. 2. For example, if the minimum and maximum RF carrier frequencies are 258 MHz and 450 MHz, respectively, then a third order difference IM product would be located at 66 MHz, which may fall within the upstream spectrum and overlap upstream channel 304. If the entire channel 304 is higher than 66 MHz, then the third order IM products would completely overlap channel 304. In such case, A3=1 and all other coefficients are set to zero in equation (1). If the lower end (e.g., the lower half) of channel 304 is less than 66 MHz and the upper end is above 66 MHz, then the third order IM products would only partially overlap channel 304. In such case, A3=1, A5=0.1, and all other coefficients are zero, in equation (1). The emulated odd order IM products are schematically shown in unfiltered form in a frequency plot in FIG. 6 as a signal 616.

In a fifth step 605 of the method in FIG. 6, the separate odd and even order IM products emulated in step 604 (i.e., signals 615 & 616) are bandpass filtered or processed in server 115 to limit their bandwidth to that of upstream OFDM channel 304 (e.g., 8 MHz bandwidth, 8-16 MHz).

The bandpass filtering process may be realized, e.g., as a back-to-back Fast Fourier Transform (FFT) and inverse FFT (IFFT) or as a finite impulse response (FIR) filter. The filtered versions of signals 615 and 616 are schematically shown in frequency plots in FIG. 6 as signals 617 and 618, respectively. Signal 617 represents the filtered even order IM products and signal 618 represents the filtered odd order IM products. After filtering, the sampling rates of signals 617 and 618 are decimated to a lower sampling rate. In some cases, the lower sampling rate is preferred for processing the samples of signals 617 and 618 (i.e., reference samples) in the cross-correlation processor or function in server 115. Decimation is accomplished by a division of the 204.8 MHz clock rate by an integer. For example, if the baseband version of channel 304 is 8 MHz, then one may chose a clock rate for cross-correlation to be 204.8 MHz/6=34.133 MHz. After decimation, signals 617 and 618 are used as reference samples in the cross-correlation of step 608. If the upstream spectrum is 42, 65 or 85 MHz, then channel 304 may occupy the full upstream spectrum (e.g., when only one upstream channel is used for all CMs). In such case, the sampling rate for signals 617 and 618 is not preferably decimated, but remains the same as an OFDM symbol, i.e., 204.8 MHz.

Now returning to FIG. 5 and time diagrams 511 and 514, the discussion of the first embodiment continues. After moment 510 (downstream transmission of RF version of symbol 501), the CMTS (e.g., I-CMTS 102) and server 115 begin to capture or otherwise acquire (the samples of) an upstream OFDM symbol 505 at a moment 516. The time delay between moments 510 and 516 is set by the CMTS scheduler according to two criteria: (1) upstream symbol 505 should be a quiet probe symbol (see DOCSIS 3.1, Section 9.4.1); and (2) the time delay should be equal to the expected round-trip time of an RF signal transmitted from the CMTS to the fiber node, plus or minus a few microseconds. The first criterion is intended to ensure that symbol 505 is captured when the CMs are not transmitting, so there are no signals interfering with the receipt of a CPD echo signal. The second criterion is intended to ensure that the CPD echo signal (formed by downstream symbol 501 at a CPD source) is captured or otherwise acquired, whether originating from a CPD source at the fiber node or deep into the coaxial cable plant (e.g., at the last passive in the node). In the method of FIG. 6, at a step 606, upstream quiet symbol 505 (and other upstream symbols) is captured by the CMTS and server 115 to carryout the method.

Note that symbol 505 is a quiet probe symbol, not an actual data carrying symbol (see, e.g., DOCSIS 3.1, spec., section 9.4.1). Its symbol duration or quiet period is used for timing the receipt of an expected CPD echo signal. During this quiet period, the CPD echo signal is expected to be received. One may think of symbol 505 as a listening period for a CPD echo. The duration of symbol 505 (or quiet or listening period) is 20 microseconds for a 2K FFT mode and 40 microseconds for a 4K FFT mode (see, e.g., DOCSIS 3.1 spec., section 7.4.13.4). This means that if symbol 505 begins at moment 516, the CPD echo signal may be detected at distances (in terms of propagation time in the coaxial cable plant) of 10 microseconds (or 20 microseconds for 4K FFT mode) down from the fiber node. A distance expressed in terms of propagation time of the signal in the coaxial cable plant is referred to as a "time distance."

The reference samples (i.e., emulated CPD echo signal or IM products) are time shifted relative to the samples of symbol 505, in order to reduce the total time for cross-correlating the samples. At the CMTS, there is limited duration to capture an upstream signal containing a CPD echo signal (e.g., symbol 505 with duration of 20 μsec or 40 μsec). If the reference samples are time shifted by half the duration of symbol 505, then the cross-correlation time interval is reduced by half. Selecting the time shift to be half the duration of symbol 505 is a reasonable compromise between obtaining enough cross-correlation data points for a useful cross-correlation function and minimizing processing time. The greater the time shift, the lesser the extent of cross-correlation (overlap) of the samples, and thus any detection peak in the correlation function will be reduced (which is not desirable). Also, the accumulation time is reduced with greater time shift, which reduces the sensitivity of CPD detection. Selecting the time shift to be half the duration of symbol 505 results in a reduction in a correlation peak by 6 dB, which, in most cases, is acceptable.

A time delay of 10 microseconds corresponds to a length of coaxial cable of 1300 meters. This is a typical length for a node, especially considering the trend toward smaller nodes in a modern HFC network. Thus, the above symbol durations should be sufficient to detect most CPD sources in these smaller nodes. If a coaxial cable plant has branches with longer coaxial cable, then samples of multiple upstream quiet OFDM symbols are captured, in a step-by-step process, over a time interval from moment 516 up to moment 517 (which begins the capture of symbol 506). The time interval between moment 510 and moment 517 represents the round-trip propagation time of a signal from the CMTS to the last passives in more traditional or legacy nodes. Each step in the step-by-step process may be a half duration of an upstream quiet OFDM symbol. This process is equivalent to scanning the coaxial cable plant for CPD sources, from the fiber node to the last passives in the node.

Referring back to FIG. 6, in step 606, the CMTS and server 115 capture a baseband version of the upstream quiet symbols (e.g., symbols 505 and 506). The baseband upstream quiet symbols have a sampling rate of 102.4 MHz, synchronized with a 10.24 MHz master clock. According to step 607, samples of the baseband upstream quiet symbols are up-sampled to a higher sampling rate (e.g., to 204.8 MHz) and up-converted to an RF upstream frequency channel (e.g., channel 304 in FIG. 3). Up-conversion is accomplished by a well-known quadrature up-conversion process in server 115. The frequency of the upstream channel is known at the CPU of the CMTS and at server 115. The up-converted or RF upstream quiet symbol is schematically shown in a frequency plot in FIG. 6, as a signal 619. Signal 619 is then cross-correlated separately with even and odd order reference samples 617 and 618 at step 608. The results are two cross-correlation functions, one based on even order reference samples 617 and the other based on odd order reference samples 618. Each cross-correlation function may be represented as a response plot of amplitude versus a time interval, where the interval corresponds to half the duration of the upstream quiet symbol (e.g., symbol 505).

Steps 601 to 608 are performed repeatedly a large number of times (e.g., 100 times), and the resulting even and odd order cross-correlation functions are coherently accumulated separately at a step 609. Coherent accumulation is used to increase the sensitivity of detection of CPD. Further details regarding accumulation and sensitivity are discussed below. At a next step 610, even and odd order cross-correlation function envelopes (FIG. 6) are calculated from the even and odd order accumulated results from step 609. A representation of an even or odd order envelope is shown in FIG. 6, as a response 620. At a step 611, the peak or peaks of the even and odd order envelopes are compared with a threshold value or level 621, and if threshold 621 is exceeded, a decision is made (in a preferred logic) that a CPD echo signal has been detected. In the preferred embodiments, if a peak is detected in at least one of the even and odd order cross-correlation envelopes, a decision is made that CPD is detected. If threshold 621 is not exceeded in either or both of the even and odd order envelopes, then the peak is ignored or a decision is made to repeat steps 601 to 610. At a step 612, a time delay associated with the CPD echo signal (i.e., peak in envelope) is measured. The time delay measurement is made by measuring a time shift of the peak in the time interval of the cross-correlation envelope (amplitude vs. time interval response). For example, the combined propagation delays (round-trip) of downstream symbol 501 and upstream symbol 505 is measured from the time shift of the peak in envelope 620 (FIG. 6). This combined propagation delay may be referred to as the time delay of the CPD echo signal. Lastly, in a step 613, a location or several candidate locations of the CPD source are identified based on the time delay measured in step 612, the velocity of propagation in the coaxial cable plant, and maps of the HFC network and/or a database of time delays or time distances. Steps 601-613 are preferably performed in server 115 in conjunction with the CMTS.

Figure 7:
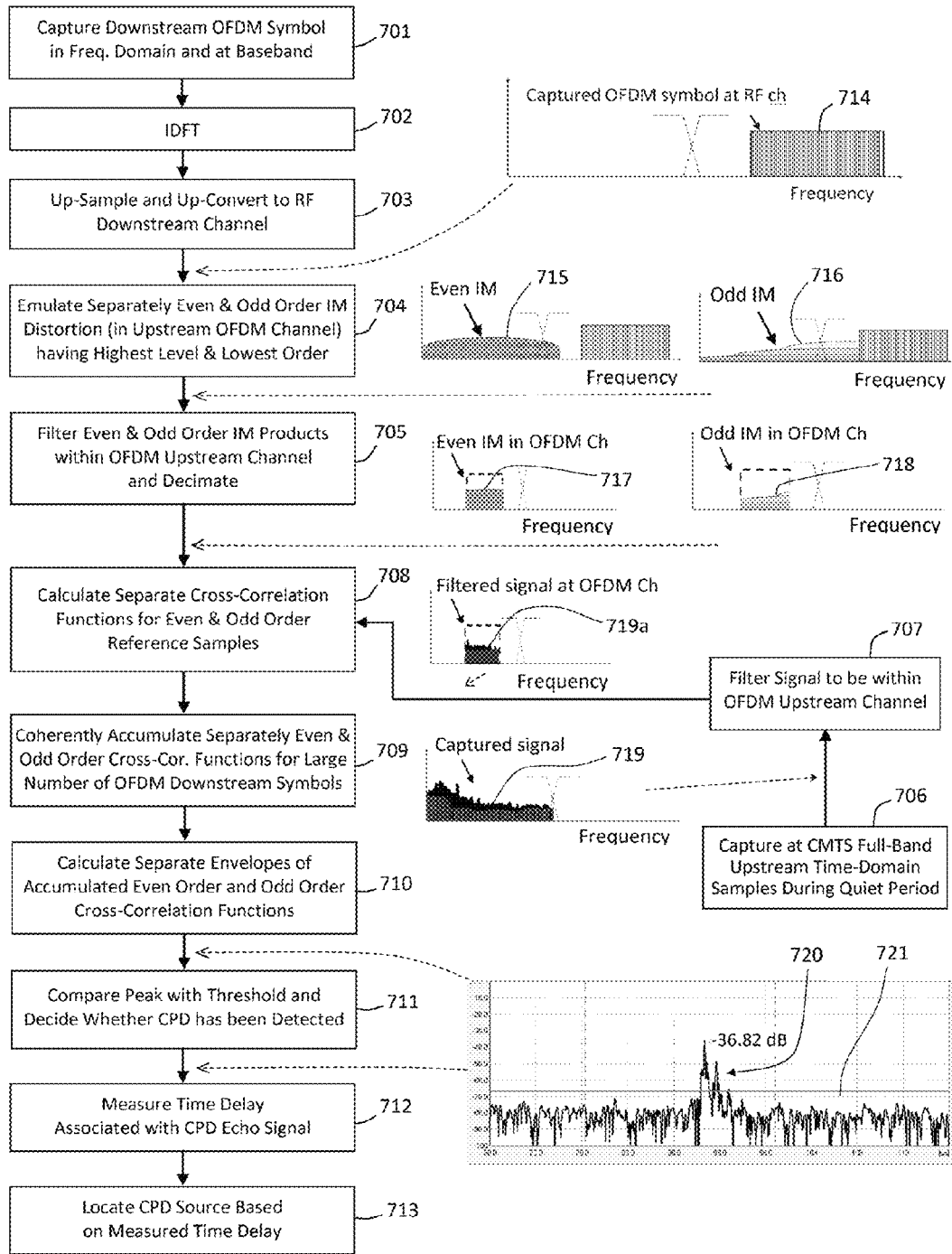
FIG. 7 is a flow diagram, with illustrations, outlining a second embodiment of the present invention, based on the synchronous capture by CMTS's of OFDM downstream symbols and full-band upstream time-domain signal samples.

Turning now to second embodiment, the method of which is understood by the flow diagram of FIG. 7 and time diagrams 511 and 515 in FIG. 5. The method of the second embodiment is essentially the same as the method of first embodiment, except that the CMTS captures full-band upstream time-domain samples during a quiet period (instead of an upstream quiet symbol in the OFDM upstream channel). The method steps 701-705 and 708-713 in FIG. 7 are essentially the same as steps 601-605 and 608-613 in FIG. 6, respectively. Also, signals 714-718 in FIG. 7 are the same as signals 614-618 in FIG. 6, respectively. Therefore, the steps in the second embodiment that relate only to the capture of the full-band upstream time-domain samples by the CMTS (and by server 115 via the CMTS) will be described in detail.

According DOCSIS 3.1 specifications, section 9.4.2, "The CMTS should be capable of providing the time-domain input samples as an alternative to the frequency-domain upstream spectrum result." Also, according to DOCSIS 3.1, section 9.4.2, the CMTS must trigger the capture of samples for spectral analysis during a quiet period (or during a quiet probe symbol). Based on these specifications, a signal timing scheme was devised and is shown in time diagram 515 in FIG. 5. Full-band upstream samples 507 are captured during a quiet period and at the same moment in time 516 as OFDM symbol 505. In the case where there is a node with long coaxial cable branches, the same step-by-step time shifting process used in the first embodiment is used in the second embodiment. Thus, full-band upstream samples 508 are captured during a quiet period and at the same moment in time 517 as OFDM symbol 506. The only difference, in some cases, from the first embodiment is in the duration of the captured samples and in the shifting step. For example, according to DOCSIS 3.1 specifications, section 9.4.2: "The CMTS must provide wideband upstream spectrum analysis capability covering the full upstream spectrum of the cable plant. The CMTS must provide 100 kHz or better resolution (bin spacing) in the wideband upstream spectrum measurement." With an FFT resolution of 100 kHz, the duration of the captured signal in the time domain should be approximately 10 microseconds. If the FFT resolution is 30 kHz, then the duration of the captured signal in the time domain is increased to approximately 30 microseconds. Thus, the time shift in time diagram 515 for samples 507 and 508 should be selected depending on the actual signal parameters of the CMTS (i.e., the maximum duration of the signal in the time domain, captured for spectral analysis).

Referring again to FIG. 7, samples of a downstream frequency-domain, baseband OFDM symbol are captured at the CMTS and server 115 in step 701. In server 115, the captured samples are converted by an IDFT process to a time-domain baseband symbol in a step 702. The time-domain symbol is then up-sampled and up-converted in a step 703 to an RF downstream time-domain OFDM symbol, which is schematically shown in a frequency plot in FIG. 7, as a signal 714. Signal 714 is located at an RF downstream frequency channel. In a step 704, signal 714 is used to emulate separately even and odd order IM distortion products 715 and 716, respectively. Emulated IM products 715 and 716 are selected from products having the highest levels and lowest orders (as in the previously described embodiment). IM products 715 and 716 are schematically shown in frequency plots in FIG. 7. In step 705, IM products 715 and 716 are filtered to be band limited to the OFDM upstream channel (e.g., channel 304), and then they are decimated to a sampling rate compatible with a cross-correlation process to be performed in a step 708. The filtered and decimated even and odd order IM products are schematically shown in frequency plots in FIG. 7, as signals 717 and 718, respectively. Signals 717 and 718 are referred to as even and odd order reference samples 717 and 718, respectively.

In a step 706, full-band upstream time-domain signal samples 719 are captured during a quiet period. In a step 707, signal samples 719 are filtered to limit the bandwidth to the upstream OFDM channel (e.g., channel 304 in FIG. 3) and reject undesirable ingress in the upstream spectrum. The filtered samples are shown in a frequency plot in FIG. 7, as a signal 719a. In step 708, filtered full-band upstream time-domain samples 719a are cross-correlated separately with even and odd order reference samples 717 and 718. The results are two cross-correlation functions, one based on even order reference samples 717 and the other based on odd order reference samples 718. Each cross-correlation function may be represented as a response plot of amplitude versus a time interval, where the interval corresponds to half the duration of the full-band upstream time-domain samples (e.g., symbol 507 in FIG. 5). Steps 701 to 708 are performed repeatedly a large number of times (e.g., 100 times), and the resulting even and odd order cross-correlation functions are coherently accumulated separately in a step 709. At a next step 710, even and odd order cross-correlation function envelopes are calculated from the even and odd order accumulated results from step 709. A representation of an even or odd order envelope is shown in FIG. 7, as a response 720. At a step 711, the peak or peaks of the even and odd order envelopes are compared with a threshold value or level 721, and, based on this comparison, a decision is made on whether a CPD echo signal has been detected. If threshold 721 has been exceeded by a peak, then a decision may be made that a CPD echo signal has been detected. If threshold 721 has not been exceeded by the peak, then the peak is ignored or a decision is made to repeat steps 701 to 710. At a step 712, a time delay associated with the CPD echo signal (i.e., peak in envelope) is measured, as in the first embodiment. Lastly, in a step 713, a location or several candidate locations of the CPD source are identified based on the time delay measured in step 712, as discussed for the first embodiment. Steps 701-713 are preferably performed in server 115 in conjunction with the CMTS.

Figure 8:
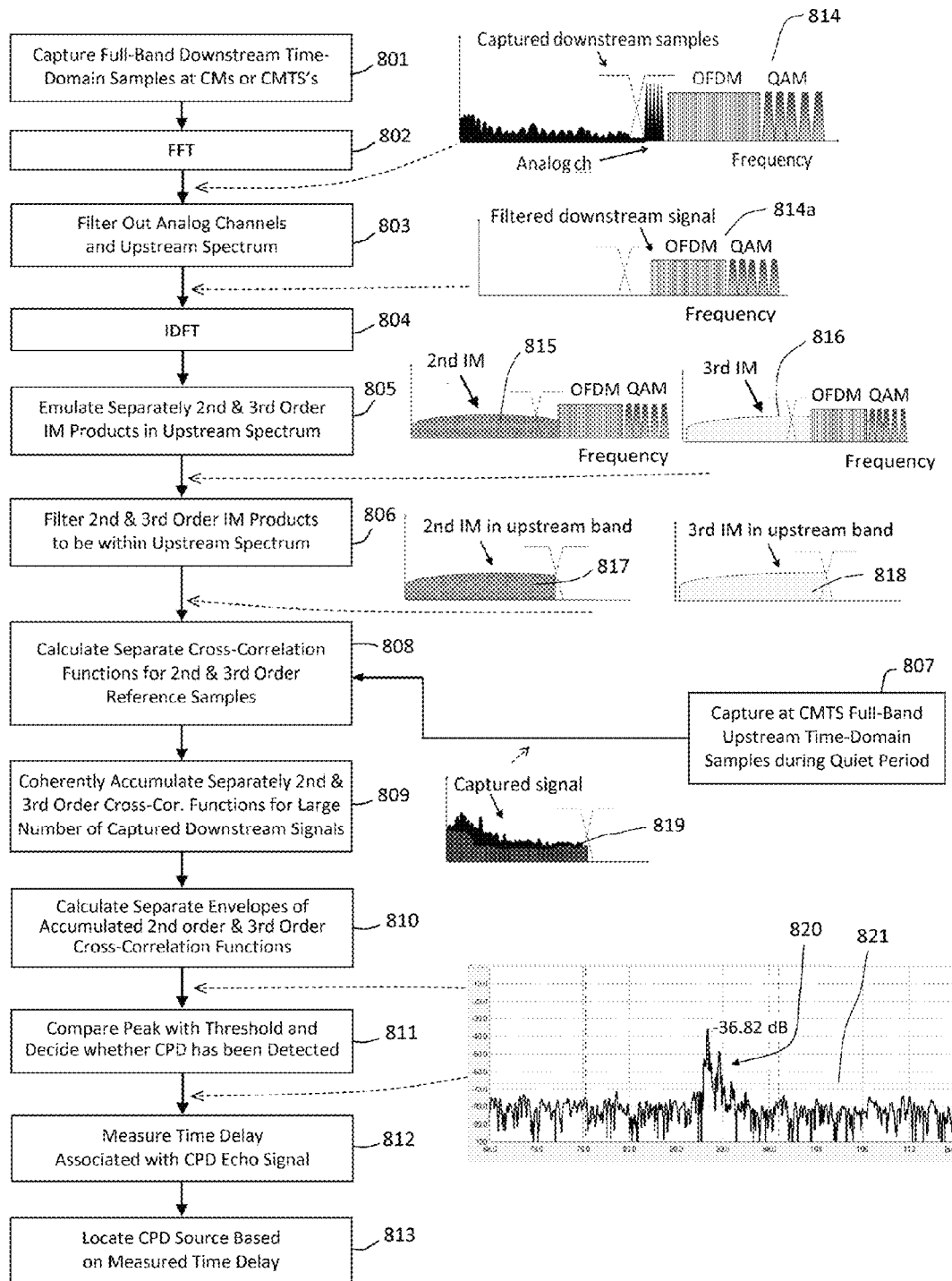
FIG. 8 is a flow diagram, with illustrations, outlining a third embodiment of the present invention, based on the synchronous capture by CMs or CMTS's of full-band downstream time-domain signal samples and the synchronous capture by CMTS's of full-band upstream time-domain signal samples.

Turning now to the third embodiment, the method of which is understood by the flow diagram of FIG. 8 and time diagrams 511-513 and 515 in FIG. 5. In a first step 801 (FIG. 8), full-band downstream time-domain samples are captured by a CMTS (e.g., I-CMTS 102) beginning at moment in time 510 (FIG. 5) or by a CM (e.g., CMs 113) at a moment in time 518 (FIG. 5). These samples are retrieved from the CMTS or CM(s) by server 115 for further processing in accordance with the method. As indicated before, the capture of full-band downstream time-domain samples by the CMTS is not a mode required by current DOCSIS specifications. But, technically, it is not a problem to implement such a mode in the CMTS.

The capture of full-band downstream time-domain samples at a CM is required by DOCSIS 3.1 specifications, but the triggering mode for capturing the samples is not defined. The DOCSIS 3.1 specification states the following with respect to a trigger: "The CM must be capable of locating and capturing the time-domain samples of the full downstream symbol marked by the trigger for analysis." DOCSIS 3.1, Section 9.4.2. This means that the DOCSIS 3.1 CM must be capable of receiving a triggering message from the CMTS via the PLC data of the downstream OFDM signal and capturing time-domain samples of an OFDM symbol pointed to by the triggering message. If so, then the CM, using full-band capture technology (e.g., such as provided by Broadcom Corporation, Irvine, Calif.), actually initially captures full-band downstream time-domain samples and then down-converts the signal to baseband and captures time-domain samples of the OFDM symbol. Thus, the triggering mode required under the current DOCSIS 3.1 should lead to CM vendors providing CMs with the capability of capturing the full-band downstream time-domain samples. Accordingly, in FIG. 5, regarding the third embodiment, a time diagram 512 illustrates the timing of capturing samples at the CMs. In one example, a CMTS sends a request to a CM #1 (FIG. 5) to capture full-band downstream time-domain samples during OFDM symbol 501, as it arrives at CM #1. Symbol 501 arrives at the input of CM #1 and CM #1 begins capturing the full-band time-domain samples at moment 518. The duration of symbol 501 (or the duration of capturing samples) at CM #1 is represented by a time interval 503 in time diagram 512. Moment 518 is defined by the trigger message in the PLC data of the OFDM signal associated with symbol 501. Note that the actual timestamp for moment 518, or the propagation time of symbol 501 from the CMTS to CM #1, is not important for CPD detection in this embodiment. What is required in this embodiment is that CM #1 (and other CMs) capture the full-band time-domain samples within the duration of symbol 501, as it occurs in time at the CM(s), e.g., during interval 503 for CM #1. In this embodiment, the timestamp or moment in time that is used is moment 510—the moment of forming the first sample of OFDM symbol 501—which serves as the initial reference time for measuring the time delay with respect to the CPD echo signal.

In server 115, the captured full-band downstream time-domain samples are converted to the frequency domain by a fast Fourier transform (FFT) process in a second step 802. The result is shown in a frequency plot in FIG. 8, as a signal 814. This full-band signal (814) may include undesirable noise in the upstream spectrum and analog channels in the downstream spectrum (in some legacy networks). Thus, in a step 803, the upstream spectrum and the analog channels are filtered out, and the result is shown in a frequency plot in FIG. 8, as a signal 814a. Signal 814a is then converted back to the time domain by an inverse discrete Fourier transform (IDFT) process in a step 804. In a step 805, the time-domain version of signal 814a is used to emulate separately second and third order IM distortion products, which are schematically shown in frequency plots in FIG. 8, as signals 815 and 816. The second and third order IM products are used in this method because, for such full-band downstream signals, these orders of IM products are dominant in the full upstream band. In a next step 806, second and third order IM products 815 and 816 are lowpass filtered to limit the products to the upstream spectrum. The filtered, second and third order IM products are shown in frequency plots in FIG. 8 as signals 817 and 818, respectively. Signals 817 and 818 are referred to as second and third order reference samples 817 and 818, respectively.

In a step 807 (FIG. 8), full-band upstream time-domain signal samples 507 and 508 are captured during quiet periods by the CMTS at moments in time 516 and 517, respectively. Full-band upstream time-domain samples 507, for example, are schematically shown in a frequency plot in FIG. 8, as signal 819. There are two ways to capture full-band upstream time-domain samples in step 807. The first way is the same as described for the second embodiment, i.e., capture samples 507 and 508 at moments 516 and 517, respectively. The second way is to capture upstream samples starting at moment 517 and only during interval 508. However, in the second way, a number (N) of CMs are instructed (by the CMTS or server 115) to each capture downstream samples during a different downstream symbol duration, for N adjacent OFDM symbol durations (e.g., from symbol durations 503 to 504, in FIG. 5). Each CM captures signal samples during a different RF OFDM symbol, from symbols 501 to 502 in FIG. 5. For example, CM #1 captures samples during symbol duration 503 corresponding to symbol 501 (see time diagram 512) and CM #N captures samples during symbol duration 504 corresponding to symbol 502 (see time diagram 513). Note, this is equivalent to transmitting a very long probe signal from the CMTS with a duration equal to the combined symbol durations 503 to 504. In this second way, full-band upstream samples (containing the echo signal) will be captured by the CMTS starting at moment 517 (and during interval 508) and will have a time delay relative to moment 510. From the point of view of calculating the cross-correlation function, it does not matter whether a short probe (downstream) signal is used and a long interval is used to receive the echo signal (e.g., time interval 507 to 508) or whether a long probe (downstream) signal is used and a short interval is used to receive the echo signal (e.g., interval 508). The latter approach is preferred, because the capture of a long downstream probe signal can be distributed between a number of different CMs, and the capture of the echo signal over a short interval reduces the load on the CMTS.

In a step 808, signal 819 is cross-correlated separately with each of the second and third order reference samples 817 and 818. Before cross-correlation, samples 817 and 818 are shifted in time by the distance between the sending CMTS and the fiber node associated with the CMTS and by half the symbol duration (e.g., interval 507 or 508). The former time shift may be predetermined by a calibration procedure or obtained from a system map or database of the HFC network. The results of cross-correlation step 808 are two cross-correlation functions, one based on second order reference samples 817 and the other based on third order reference samples 818. Each cross-correlation function may be represented as a response plot of amplitude versus a time interval, where the interval corresponds to half the duration of the full-band upstream time-domain samples (e.g., half of duration 507 or 508 in FIG. 5). Steps 801 to 808 are performed repeatedly a large number of times (e.g., 100 times), and the resulting second and third order cross-correlation functions are separately coherently accumulated at a step 809. At a step 810, second and third order cross-correlation function envelopes are calculated from the second and third order accumulated results from step 809. A second or third order cross-correlation envelope is represented in FIG. 8 as a response 820. At a step 811, the peak or peaks of the second and third order envelopes are compared with a threshold value or level 821, and, based on this comparison, a decision is made on whether a CPD echo signal has been detected. If threshold 821 has been exceeded by a peak, then a decision may be made that a CPD echo signal has been detected. If threshold 821 has not been exceeded by the peak, then the peak is ignored or a decision is made to repeat steps 801 to 810. In a step 812, a time delay associated with the CPD echo signal (i.e., peak in envelope) is measured, as in the first and second embodiments. Lastly, in a step 813, a location or several candidate locations of the CPD source are identified based on the time delay measured in step 812, as discussed for the first embodiment. Steps 801 to 813 may be performed in server 115 in conjunction with the CMTS's and CMs or are performed directly in the CMTS's and CMs. Alternatively, a dedicated CPD radar server may be employed.

Figure 9:
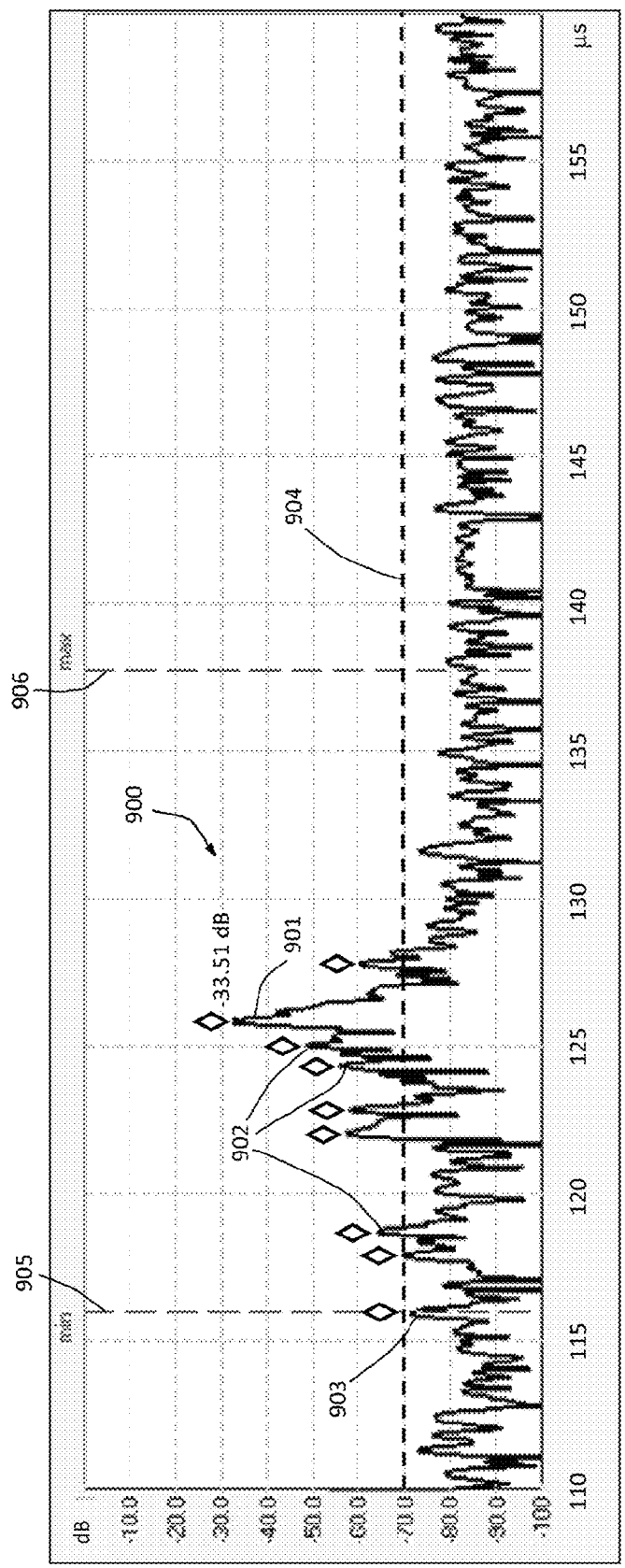
FIG. 9 is an illustration of a typical cross-correlation function indicating the detection of multiple sources of CPD in a network node.

Referring now to FIG. 9, there is shown an actual envelope 900 of a cross-correlation function from a current Hunter® CPD radar system by Arcom Digital, LLC, for a particular node under test. Envelope 900 is also referred to as a CPD response. Envelope 900 includes a maximal peak 901, which is normalized to the CPD noise level within a 6.4 MHz upstream QAM channel and a typical QAM signal level of 0 dBmV at the input of the CMTS. This means that the carrier to CPD noise ratio (CNR for CPD) from the dominant CPD source (peak 901) is only −33.51 dB (see peak level marker in FIG. 9). Envelope 900 contains a number of lower level CPD sources, represented by peaks 902 and 903, at different time distances in the node under test. Peak 903 corresponds to a minimum time delay 905 in the node, which means the CPD source is located at the fiber node or a nearby passive. Note, the difference between minimum time delay 905 and a maximum time delay 906, within the coaxial cable portion of the node, is approximately 20 microseconds. Thus, this time interval can be scanned by capturing, e.g., just one OFDM symbol 505 (FIG. 5) with a duration 40 microseconds (4K FFT mode).

To prevent false alarms or false detections of CPD, a threshold 904 is set at −70 dB or at approximately +15 dB higher than the average level of the envelope's noise floor in a region of the time interval where there are no expected echo signals, such as between 140 to 150 microseconds. This means that CPD can be detected by the embodiments of the present invention with very good sensitivity, e.g., when CPD is approximately 70 dB down from the upstream signal level. This sensitivity will help achieve the goal of PNM, which is to detect CPD and eliminate CPD sources before they can really impact data transmission in the upstream.

The sensitivity of detection of CPD depends on the accumulation time and the bandwidth of the cross-correlation. These two parameters define the energy of the detected CPD echo signal. A sensitivity of −70 dBmV (as illustrated in FIG. 9) is realized from an accumulation time of 200 milliseconds and a bandwidth of 8 MHz, at upstream frequencies 8 to 16 MHz, where the noise floor is typically at least 10 dB higher than at frequencies above 16 MHz. Let us determine what accumulation time is needed to realize a −70 dBmV sensitivity in the above-described embodiments of the present invention. Assume that the duration of an OFDM symbol is 40 microseconds for both the downstream and upstream signals, and that this duration is sufficient to scan the full time distance interval of a coaxial cable plant of the node under test. This assumption is realistic for a typical node. Accumulation times for larger time distance intervals can be easily calculated. Also, assume that the upstream samples are captured in an upstream band of 5 to 85 MHz (80 MHz bandwidth). Due to the wide bandwidth (10 times the above-mentioned 8 MHz), and a lower (up to 10 dB) noise floor above 16 MHz, the accumulation time of 200 milliseconds can be reduced by approximately 100 times to 2 milliseconds. This means that the number of accumulated OFDM symbols should be: 2000 microseconds/(40 microseconds/2)=100. (The 40 microseconds is divided by 2 because of cross-correlating over half the symbol duration.) Therefore, if OFDM symbol samples are captured once per second (to minimize the load on the CMTS), then the cross-correlation function (or CPD response) will be accumulated within 100 seconds. This period is sufficient for the collection of CPD statistics over time. For example, in existing commercial CPD monitoring systems, the average period for monitoring CPD can be as long as 3 to 5 minutes, due to the large number of nodes needed to be scanned.

From the above analysis, it becomes clear that the above-described embodiments of the present invention can be effectively implemented in a CMTS, PNM server, or a dedicated CPD radar server. A significant advantage of the present invention is that it can be implemented without any extra equipment being installed at the headend of the cable television network.

The various functions of the present invention, as described above, may be implemented in hardware, firmware, software, or a combination of these. For example, with respect to hardware, these functions may be implemented in an application specific integrated circuit (ASIC), digital signal processor (DSP), field programmable gate array (FPGA), micro-controller, microprocessor, programmable logic device, general purpose computer, special purpose computer, other electronic device, or a combination of these devices (hereinafter "processor"). If the various functions are implemented in firmware, software, or other computer-executable instructions, then they may be stored on any suitable computer-readable media. Computer-executable instructions may cause a processor or other device to perform the aforementioned functions of the present invention. Computer-executable instructions include data structures, objects, programs, routines, or other program modules accessible and executable by a processor. The computer-readable media may be any available media accessable by a processor. Embodiments of the present invention may include one or more computer-readable media. Generally, computer-readable media include, but are not limited to, random-access memory ("RAM), read-only memory ("ROM), programmable read-only memory ("PROM"), erasable programmable read-only memory ("EPROM"), electrically erasable programmable read-only memory ("EEPROM"), compact disk read-only memory ("CD-ROM), or any other device or component that is capable of providing data or executable instructions accessible by a processor. Certain embodiments recited in the claims may be limited to the use of tangible, non-transitory computer-readable media, and the phrases "tangible computer-readable medium" and "non-transitory computer-readable medium" (or plural variations) used herein are intended to exclude transitory propagating signals per se.

While the preferred embodiments of the invention have been particularly described in the specification and illustrated in the drawing, it should be understood that the invention is not so limited. Many modifications, equivalents and adaptations of the invention will become apparent to those skilled in the art without departing from the spirit and scope of the invention, as defined in the appended claims.

What is claimed is:

1. An apparatus for detecting a common path distortion (CPD) source in a hybrid fiber coax (HFC) network of a network system including a cable modem termination system (CMTS) that transmits a multiplicity of downstream signals at a radio frequency (RF) downstream frequency band in the HFC network and a plurality of cable modems (CMs) that transmit upstream signals at an RF upstream frequency band in the HFC network, the multiplicity of downstream signals being transmitted during a multiplicity of downstream periods, respectively, and the upstream signals not being transmitted during a multiplicity of quiet periods, the CPD source generating from the multiplicity of downstream signals a multiplicity of CPD echo signals, respectively, at the RF upstream frequency band, the multiplicity of CPD echo signals being received by the CMTS during the multiplicity of quiet periods, respectively, said apparatus comprising:
   (a) downstream signal processing means, associated with the CMTS of the network system, for acquiring the multiplicity of downstream signals in synchronism with the multiplicity of downstream periods, respectively, and for producing a set of RF downstream samples of each downstream signal at the RF downstream frequency band;
   (b) CPD emulation means, associated with said downstream signal processing means, for generating a set of even order intermodulation (IM) product samples and a set of odd order IM product samples from each set of RF downstream samples, to produce a multiplicity of sets of even order IM product samples and a multiplicity of sets of odd order IM product samples;
   (c) upstream signal processing means, associated with the CMTS of the network system, for acquiring the multiplicity of CPD echo signals in synchronism with the multiplicity of quiet periods, respectively, and for producing a set of CPD echo signal samples of each CPD echo signal at the RF upstream frequency band, such that a multiplicity of sets of CPD echo signal samples are provided;
   (d) cross-correlation means, associated with said CPD generation means and said upstream signal processing means, for cross-correlating—
      (i) the multiplicity of sets of even order IM product samples with the multiplicity of sets of CPD echo signal samples, respectively, to produce a multiplicity of even order cross-correlation functions, and
      (ii) the multiplicity of sets of odd order IM product samples with the multiplicity of sets of CPD echo signal samples, respectively, to produce a multiplicity of odd order cross-correlation functions;
   (e) accumulation means, associated with said cross-correlation means, for coherently accumulating—
      (i) the multiplicity of even order cross-correlation functions, to produce an accumulated even order cross-correlation function characterized by an even order envelope, and
      (ii) the multiplicity of odd order cross-correlation functions, to produce an accumulated odd order cross-correlation function characterized by an odd order envelope; and
   (f) detection means, associated with said accumulation means, for detecting the CPD source from either or both of the even and odd order envelopes by the presence of a peak in either or both of the envelopes.

2. The apparatus of claim 1, further comprising:
   (g) time delay means, associated with said detection means, for measuring a time delay value associated with the CPD source by examining the position of the peak in either or both of the envelopes; and
   (h) means, associated with said time delay means, for determining a location or a plurality of candidate locations of the CPD source in the HFC network based on the time delay value.

3. The apparatus of claim 1, wherein the multiplicity of downstream signals are a multiplicity of downstream orthogonal frequency division multiplexing (OFDM) symbols, respectively, said downstream signal processing means—
   (i) acquiring the multiplicity of downstream OFDM symbols at a first baseband frequency band,
   (ii) up-converting the multiplicity of downstream OFDM symbols from the first baseband frequency band to the RF downstream frequency band, and
   (iii) producing a set of RF downstream samples from each downstream OFDM symbol at the RF downstream frequency band.

4. The apparatus of claim 3, wherein said upstream signal processing means acquires the multiplicity of CPD echo signals at a second baseband frequency band and up-converts the multiplicity of CPD echo signals from the second baseband frequency band to the RF upstream frequency band.

5. The apparatus of claim 3, wherein said upstream signal processing means acquires the multiplicity of CPD echo signals at the RF upstream frequency band.

6. The apparatus of claim 1, wherein said downstream signal processing means acquires the multiplicity of downstream signals at the RF downstream frequency band.

7. The apparatus of claim 6, wherein said upstream signal processing means acquires the multiplicity of CPD echo signals at the RF upstream frequency band.

8. The apparatus of claim 6, wherein the multiplicity of downstream signals at the RF downstream frequency band are captured in one of the plurality of CMs and then transmitted as a CM-captured signal to the CMTS, said downstream signal processing means acquiring the CM-captured signal from the CMTS.

9. The apparatus of claim 1, further comprising:

(g) means, associated with said accumulation means, for calculating the even order envelope from the accumulated even order cross-correlation function and the odd order envelope from the accumulated odd order cross-correlation function.

10. The apparatus of claim 1, wherein a multiplicity of quiet probe symbols at the RF upstream frequency band are received by the CMTS during the multiplicity of quiet periods, respectively, the multiplicity of CPD echo signals being received together with the multiplicity of quiet probe symbols, respectively, said upstream signal processing means acquiring from the CMTS, for each quiet period, a set of samples of a combined signal containing one of the quiet probe symbols and one of the CPD echo signals.

11. A method of detecting a common path distortion (CPD) source in a hybrid fiber coax (HFC) network of a network system including a cable modem termination system (CMTS) that transmits a multiplicity of downstream signals at a radio frequency (RF) downstream frequency band in the HFC network and a plurality of cable modems (CMs) that transmit upstream signals at an RF upstream frequency band in the HFC network, the multiplicity of downstream signals being transmitted during a multiplicity of downstream periods, respectively, and the upstream signals not being transmitted during a multiplicity of quiet periods, the CPD source generating from the multiplicity of downstream signals a multiplicity of CPD echo signals, respectively, at the RF upstream frequency band, the multiplicity of CPD echo signals being received by the CMTS during the multiplicity of quiet periods, respectively, said method comprising the steps of:

(a) acquiring the multiplicity of downstream signals in synchronism with the multiplicity of downstream periods, respectively, and producing a set of RF downstream samples of each downstream signal at the RF downstream frequency band;

(b) generating a set of even order intermodulation (IM) product samples and a set of odd order IM product samples from each set of RF downstream samples, to produce a multiplicity of sets of even order IM product samples and a multiplicity of sets of odd order IM product samples;

(c) acquiring the multiplicity of CPD echo signals in synchronism with the multiplicity of quiet periods, respectively, and producing a set of CPD echo signal samples of each CPD echo signal at the RF upstream frequency band, such that a multiplicity of sets of CPD echo signal samples are provided;

(d) cross-correlating—
  (i) the multiplicity of sets of even order IM product samples with the multiplicity of sets of CPD echo signal samples, respectively, to produce a multiplicity of even order cross-correlation functions, and
  (ii) the multiplicity of sets of odd order IM product samples with the multiplicity of sets of CPD echo signal samples, respectively, to produce a multiplicity of odd order cross-correlation functions;

(e) coherently accumulating—
  (i) the multiplicity of even order cross-correlation functions, to produce an accumulated even order cross-correlation function characterized by an even order envelope, and
  (ii) the multiplicity of odd order cross-correlation functions, to produce an accumulated odd order cross-correlation function characterized by an odd order envelope; and (f) detecting the CPD source from either or both of the even and odd order envelopes by the presence of a peak in either or both of the envelopes.

12. The method of claim 11, further comprising the steps of:

(g) measuring a time delay value associated with the CPD source by examining the position of the peak in either or both of the envelopes; and (h) determining a location or a plurality of candidate locations of the CPD source in the HFC network based on the time delay value.

13. The method of claim 11, wherein the multiplicity of downstream signals are a multiplicity of downstream orthogonal frequency division multiplexing (OFDM) symbols, respectively, and wherein step (a) includes—
  (i) acquiring the multiplicity of downstream OFDM symbols at a first baseband frequency band,
  (ii) up-converting the multiplicity of downstream OFDM symbols from the first baseband frequency band to the RF downstream frequency band, and
  (iii) producing a set of RF downstream samples from each downstream OFDM symbol at the RF downstream frequency band.

14. The method of claim 13, wherein step (c) includes—
  (i) acquiring the multiplicity of CPD echo signals at a second baseband frequency band, and
  (ii) up-converting the multiplicity of CPD echo signals from the second baseband frequency band to the RF upstream frequency band.

15. The method of claim 11, wherein step (c) includes acquiring the multiplicity of CPD echo signals at the RF upstream frequency band.

16. The method of claim 11, wherein step (a) includes acquiring the multiplicity of downstream signals at the RF downstream frequency band.

17. The method of claim 16, wherein step (c) includes acquiring the multiplicity of CPD echo signals at the RF upstream frequency band.

18. The method of claim 16, wherein, prior to step (a), the multiplicity of downstream signals at the RF downstream frequency band are captured in one of the plurality of CMs and then transmitted as a CM-captured signal to the CMTS, and wherein step (a) includes acquiring the CM-captured signal from the CMTS.

19. The method of claim 11, further comprising the step of:

(g) calculating the even order envelope from the accumulated even order cross-correlation function and the odd order envelope from the accumulated odd order cross-correlation function.

20. The method of claim 11, wherein a multiplicity of quiet probe symbols at the RF upstream frequency band are received by the CMTS during the multiplicity of quiet periods, respectively, the multiplicity of CPD echo signals being received together with the multiplicity of quiet probe symbols, respectively, and wherein step (c) includes acquiring from the CMTS, for each quiet period, a set of samples of a combined signal containing one of the quiet probe symbols and one of the CPD echo signals.

21. A method of detecting a common path distortion (CPD) source in a hybrid fiber coax (HFC) network of a network system including a cable modem termination system (CMTS) that transmits a downstream orthogonal frequency division multiplexing (OFDM) symbol at a radio frequency (RF) downstream frequency band in the HFC network and a plurality of cable modems (CMs) that transmit upstream signals at an RF upstream frequency band in the HFC network, the downstream OFDM symbol being transmitted during a downstream symbol period and the upstream signals not being transmitted during a quiet period, the CPD source generating from the downstream OFDM symbol a CPD echo signal at the RF upstream frequency band, the CPD echo signal being received by the CMTS during the quiet period, said method comprising the steps of:

(a) acquiring the downstream OFDM symbol at a first baseband frequency band and in synchronism with the downstream symbol period;

(b) up-converting the downstream OFDM symbol from the first baseband frequency band to the RF downstream frequency band, to produce a constructed RF downstream OFDM symbol that is coherent with the downstream OFDM symbol transmitted in the HFC network;

(c) generating even and odd order intermodulation distortion products from the constructed RF downstream OFDM symbol;

(d) acquiring the CPD echo signal at a second baseband frequency band and in synchronism with the quiet period;

(e) up-converting the CPD echo signal from the second baseband frequency band to the RF upstream frequency band, to produce a constructed RF CPD echo signal;

(f) cross-correlating the even and odd order intermodulation distortion products separately with the constructed RF CPD echo signal, to produce separate even and odd order cross-correlation functions;

(g) repeating steps (a) through (f) a multiplicity of times for a multiplicity of downstream OFDM symbols transmitted in the HFC network and for a multiplicity of CPD echo signals generated by the CPD source from the multiplicity of downstream OFDM symbols, respectfully, to produce a multiplicity of even order and odd order cross-correlation functions;

(h) coherently accumulating—
 (i) the multiplicity of even order cross-correlation functions, to produce an accumulated even order cross-correlation function characterized by an even order envelope, and
 (ii) the multiplicity of odd order cross-correlation functions, to produce an accumulated odd order cross-correlation function characterized by an odd order envelope; and (i) detecting the CPD source from either or both of the even and odd order envelopes by the presence of a peak in either or both of the envelopes.

22. The method of claim 21, further comprising the steps of:

(j) measuring a time delay value associated with the CPD source by examining the position of the peak in either or both of the envelopes; and (k) determining a location or a plurality of candidate locations of the CPD source in the HFC network based on the time delay value.

23. A method of detecting a common path distortion (CPD) source in a hybrid fiber coax (HFC) network of a network system including a cable modem termination system (CMTS) that transmits a downstream orthogonal frequency division multiplexing (OFDM) symbol at a radio frequency (RF) downstream frequency band in the HFC network and a plurality of cable modems (CMs) that transmit upstream signals at an RF upstream frequency band in the HFC network, the downstream OFDM symbol being transmitted during a downstream symbol period and the upstream signals not being transmitted during a quiet period, the CPD source generating from the downstream OFDM symbol a CPD echo signal at the RF upstream frequency band, the CPD echo signal being received by the CMTS during the quiet period, said method comprising the steps of:

(a) acquiring the downstream OFDM symbol at a first baseband frequency band and in synchronism with the downstream symbol period;

(b) up-converting the downstream OFDM symbol from the first baseband frequency band to the RF downstream frequency band, to produce a constructed RF downstream OFDM symbol that is coherent with the downstream OFDM symbol transmitted in the HFC network;

(c) generating even and odd order intermodulation distortion products from the constructed RF downstream OFDM symbol;

(d) acquiring the CPD echo signal at the RF upstream frequency band and in synchronism with the quiet period;

(e) cross-correlating the even and odd order intermodulation distortion products separately with the CPD echo signal at the RF upstream frequency band, to produce separate even and odd order cross-correlation functions;

(f) repeating steps (a) through (e) a multiplicity of times for a multiplicity of downstream OFDM symbols transmitted in the HFC network and for a multiplicity of CPD echo signals generated by the CPD source from the multiplicity of downstream OFDM symbols, respectfully, to produce a multiplicity of even order and odd order cross-correlation functions;

(g) coherently accumulating—
 (i) the multiplicity of even order cross-correlation functions, to produce an accumulated even order cross-correlation function characterized by an even order envelope, and
 (ii) the multiplicity of odd order cross-correlation functions, to produce an accumulated odd order cross-correlation function characterized by an odd order envelope; and (h) detecting the CPD source from either or both of the even and odd order envelopes by the presence of a peak in either or both of the envelopes.

24. The method of claim 23, further comprising the steps of:

(i) measuring a time delay value associated with the CPD source by examining the position of the peak in either or both of the envelopes; and (j) determining a location or a plurality of candidate locations of the CPD source in the HFC network based on the time delay value.

25. A method of detecting a common path distortion (CPD) source in a hybrid fiber coax (HFC) network of a network system including a cable modem termination system (CMTS) that transmits a downstream signal at a radio frequency (RF) downstream frequency band in the HFC network and a plurality of cable modems (CMs) that transmit upstream signals at an RF upstream frequency band in the HFC network, the downstream signal being transmitted during a downstream period and the upstream signals not being transmitted during a quiet period, the CPD source generating from the downstream signal a CPD echo signal at the RF upstream frequency band, the CPD echo signal being received by the CMTS during the quiet period, said method comprising the steps of:

(a) acquiring the downstream signal at the RF downstream frequency band and in synchronism with the downstream period;
(b) generating even and odd order intermodulation distortion products from the downstream signal acquired in step (a);
(c) acquiring the CPD echo signal at the RF upstream frequency band and in synchronism with the quiet period;
(d) cross-correlating the even and odd order intermodulation distortion products separately with the CPD echo signal at the RF upstream frequency band, to produce separate even and odd order cross-correlation functions;
(e) repeating steps (a) through (d) a multiplicity of times for a multiplicity of downstream signals transmitted in the HFC network and for a multiplicity of CPD echo signals generated by the CPD source from the multiplicity of downstream signals, respectfully, to produce a multiplicity of even order and odd order cross-correlation functions;
(f) coherently accumulating—
  (i) the multiplicity of even order cross-correlation functions, to produce an accumulated even order cross-correlation function characterized by an even order envelope, and
  (ii) the multiplicity of odd order cross-correlation functions, to produce an accumulated odd order cross-correlation function characterized by an odd order envelope; and
(g) detecting the CPD source from either or both of the even and odd order envelopes by the presence of a peak in either or both of the envelopes.

26. The method of claim 25, further comprising the steps of:
(h) measuring a time delay value associated with the CPD source by examining the position of the peak in either or both of the envelopes; and
(i) determining a location or a plurality of candidate locations of the CPD source in the HFC network based on the time delay value.

27. The method of claim 25, wherein the downstream signal is an orthogonal frequency division multiplexing (OFDM) signal, and wherein
step (a) includes acquiring the downstream OFDM signal at the RF downstream frequency band and in synchronism with the downstream period, and
step (b) includes generating even and odd order intermodulation distortion products from the downstream OFDM signal acquired in step (a).

* * * * *